(12) United States Patent
Oma et al.

(10) Patent No.: US 10,824,569 B2
(45) Date of Patent: Nov. 3, 2020

(54) DATA PROCESSING SYSTEMS

(71) Applicant: Arm Limited, Cambridge (GB)

(72) Inventors: Asmund Kvam Oma, Trondheim (NO); Antonio Garcia Guirado, Trondheim (NO)

(73) Assignee: Arm Limited, Cambridge (GB)

( * ) Notice: Subject to any disclaimer, the term of this patent is extended or adjusted under 35 U.S.C. 154(b) by 42 days.

(21) Appl. No.: 16/251,576

(22) Filed: Jan. 18, 2019

(65) Prior Publication Data

US 2020/0233808 A1 Jul. 23, 2020

(51) Int. Cl.
*G06F 12/084* (2016.01)
*G06F 12/0873* (2016.01)
*G06F 12/0868* (2016.01)
*G06F 12/0871* (2016.01)
*G06F 9/38* (2018.01)

(52) U.S. Cl.
CPC ........ *G06F 12/0873* (2013.01); *G06F 12/084* (2013.01); *G06F 12/0868* (2013.01); *G06F 12/0871* (2013.01); *G06F 9/3877* (2013.01)

(58) Field of Classification Search
CPC .. G06F 12/084; G06F 12/0875; G06F 12/126; G06F 2212/1016; G06F 2221/2141; G06F 12/0871; G06F 12/0868; G06F 12/0873; G06F 9/3877
USPC ........................................................ 711/113
See application file for complete search history.

(56) References Cited

U.S. PATENT DOCUMENTS

| 2013/0024609 A1* | 1/2013 | Gorobets | G06F 3/0611 |
| | | | 711/103 |
| 2016/0093102 A1* | 3/2016 | Doyle | G06T 15/80 |
| | | | 345/423 |
| 2019/0121567 A1* | 4/2019 | Kim | G06F 3/0644 |

\* cited by examiner

*Primary Examiner* — Hashem Farrokh
(74) *Attorney, Agent, or Firm* — Vierra Magen Marcus LLP

(57) ABSTRACT

A cache is disclosed in which a dedicated cache portion comprising one or more extra lines dedicated for data of a particular data type is provided alongside a shared cache portion. So long as there is a cache line available in the shared cache portion, data can be written into the shared cache portion. However, when the shared cache portion is fully locked such that no new data can be written into the shared cache portion, data can instead be written to its respective dedicated cache portion, effectively bypassing the fully locked shared cache portion.

20 Claims, 11 Drawing Sheets

DATA PROCESSING SYSTEMS

BACKGROUND

The technology described herein relates to data processing systems and in particular to cache operations in data processing systems.

Many data processing systems use caches to store data, etc., locally to a data processing unit or units so as to reduce the need to fetch data from slower data stores, such as main memory of the data processing system.

In such arrangements, when data is required for a data processing operation being performed by the data processing unit(s), it will be first determined whether the data is available in the appropriate cache (a cache "lookup"). When the data is not present in the cache (there is a cache "miss"), the data needs to be fetched from its associated data store, e.g. in main memory, and the process will then operate to first fetch the relevant data into the cache, with the processing operation being stalled until the relevant data is available in the cache.

On the other hand, when the data is already present in the cache (there is a cache "hit"), the data can then be read into the data processing unit(s) from the local cache, rather than from the main data store where it is stored, thereby allowing the processing operation to proceed more rapidly. Such arrangements can therefore work well to reduce latency and/or improve throughput within the data processing system.

However, the Applicants believe that there remains scope for improvements to cache operations in data processing systems.

BRIEF DESCRIPTION OF THE DRAWINGS

Various embodiments of the technology described herein will now be described by way of example only and with reference to the accompanying drawings, in which.

DETAILED DESCRIPTION

Figure 1:
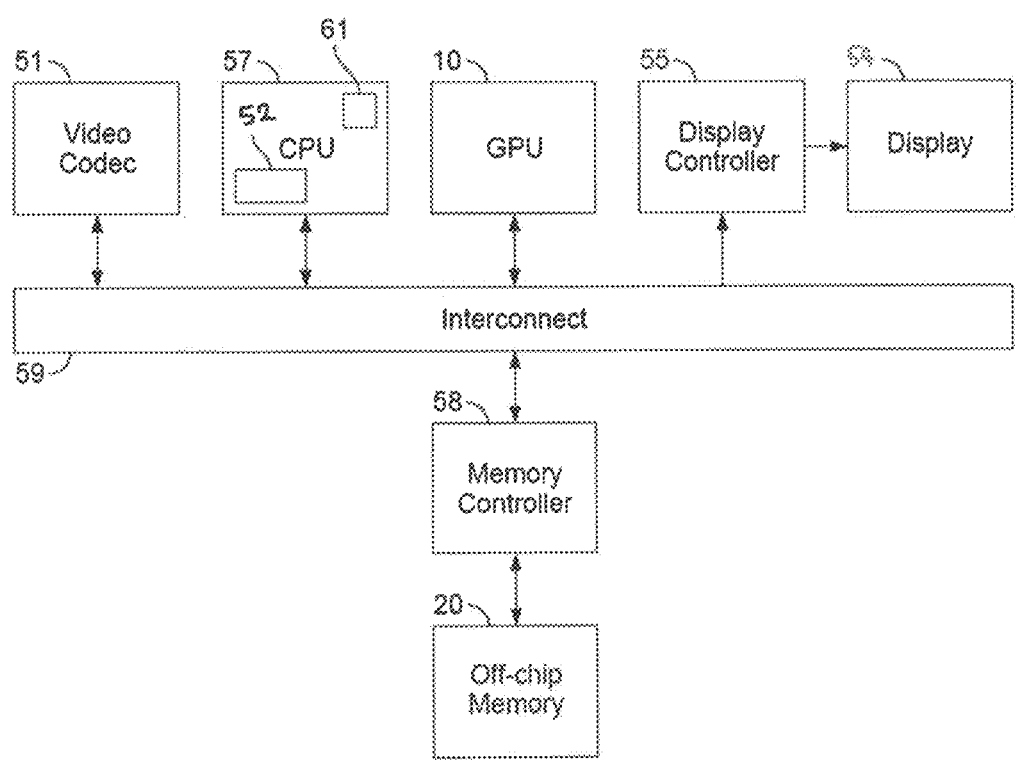
FIG. 1 shows an exemplary data processing system in which the technology described herein may be implemented.

A first embodiment of the technology described herein comprises a data processing system comprising:

a memory system;

one or more data processing unit(s); and a cache arranged between the memory system and the data processing unit(s) and operable to transfer data stored in the memory system to the data processing unit(s) for use thereby during a data processing operation, wherein the cache is operable to store data of at least a first data type and a second data type for use by the data processing unit(s), wherein the processing of data of the second data type during a data processing operation is dependent on the processing of data of the first data type;

the cache comprising:

a first, shared cache portion comprising a plurality of cache lines that are available for data of at least the first and second data types, such that so long as there is a cache line in the shared cache portion that is available to be allocated for new data, data of both the first and second data types is written into the shared cache portion; and a second, dedicated cache portion comprising one or more cache lines that are dedicated for data of the second data type, wherein when the shared cache portion is fully locked such that no new data can be written to the shared cache portion, data of the second data type can instead be written to the dedicated cache portion for transfer to the data processing unit(s).

A second embodiment of the technology described herein comprises a method of operating a data processing system that comprises a memory system, one or more data processing unit(s), and a cache arranged between the memory system and the data processing unit(s) and operable to transfer data stored in the memory system to the data processing unit(s) for use thereby during a data processing operation, the cache being operable to store data of at least a first data type and a second data type for use by the data processing unit(s), wherein the processing of data of the second data type by the data processing unit(s) during a data processing operation is dependent on the processing of data of the first data type;

the cache comprising:

a first, shared cache portion comprising a plurality of cache lines that are available for data of at least the first and second data types; and a second, dedicated cache portion comprising one or more cache lines that are dedicated for data of the second data type;

the method comprising:

when fetching data of either the first or the second data type from the memory system into the cache, so long as there is a cache line in the shared cache portion that is available to be allocated for new data, writing data of both the first and second data types into the shared cache portion; and when the shared cache portion is fully locked so that no new data can be written to the shared cache portion, so long as there is a cache line in the dedicated cache portion that is available to be allocated for new data, writing data of the second data type into its dedicated cache portion for transfer to the data processing unit(s).

The technology described herein relates generally to the operation of a cache within a data processing system that is used to temporarily store (hold) data in an intermediate location between a memory system (e.g. main memory) of the data processing system and a data processing unit (or units) that is requesting the data for processing. Often, a given data processing operation (or sequence of operations) that is to be performed by the data processing unit(s) of the data processing system may involve processing multiple different types of data, and the data processing system may therefore generate requests to memory for each of these data types during the processing operation(s).

Accordingly, in order to reduce the latency associated with having to fetch this data from the memory system, it may be desirable to fetch (or 'prefetch') at least some of this data into local storage, i.e. a cache, of or associated with the data processing unit(s), so that the data can be temporarily stored locally to the data processing unit(s) prior to its transfer to the desired data processing unit(s) for processing.

To this end, each different type of data could potentially be stored in a separate (dedicated) cache for that data type.

However, in the technology described herein, rather than using a plurality of separate caches for different types of data, a "shared" cache portion is provided that is able to simultaneously handle (store) a number of different types of data, i.e. data of at least first and second, different types. That is, in the technology described herein, at least a (first) portion of the cache is configured to operate as a "shared" cache, for temporarily storing and transferring data of a plurality of different data types.

Storing multiple different types of data in this way within a (single) shared cache portion may be beneficial because the whole of the shared cache portion is then available to handle whatever data is available and/or required at a particular instant. So, when a processing operation at a particular instant is only using data of a first data type, the whole cache can be used for transferring data of that type. Accordingly, when compared to using one dedicated cache per type of data, a shared cache may at least in some instances provide a larger effective cache size for the same total area.

It will be appreciated that there are various examples of data processing systems wherein it is beneficial to be able to store multiple different types of data within a single shared cache, and the technology described herein may generally be applied to any suitable such data processing systems.

One example of where such a shared cache might advantageously be utilised would be within a cache system for a texture mapper within the graphics processing pipeline of a graphics processor, wherein texture data stored in the main (e.g. L2) system memory is ultimately to be transferred into a texture cache that interfaces with the texture mapper of the graphics processor, and from which it can therefore be provided to the texture mapper for performing requested texture processing operations. The texture data is in an embodiment (and typically) stored in system memory in a compressed format, and the compressed texture data is in an embodiment decompressed before it is provided to the texture mapper. To facilitate this, the compressed texture data from the system memory may thus first be stored in an intermediate (e.g. L1) shared cache of the cache system for the texture mapper alongside various headers and descriptors for the compressed texture data, e.g. depending on the compression scheme.

For instance, the compressed texture data, along with the relevant headers and descriptors, may first be loaded into an intermediate (L1) shared cache, from which cache this data can first be provided to a suitable data processing circuit, or circuitry, in order to convert it into a suitable (decompressed) format, and the decompressed texture data (e.g. in the form of one or more 'texels') can then be loaded into the texture (or 'texel') cache for access by the texture mapper.

In this example, there are potentially three different types of data passing through the intermediate shared (L1) cache at any instant. However, for instances when no header data and no compressed texture data is being used, the whole of the intermediate (L1) shared cache may be used to store descriptors, and so on. Or, in a similar vein, when the compressed format for the texture data does not require any headers, the intermediate (L1) shared cache may be used to store (only) descriptors and compressed texture data.

Other arrangements would of course be possible.

In such cases, configuring the cache as a shared cache so that the cache entries are available to handle whatever type(s) of data currently being processed, can thus improve the performance of the cache.

However, the Applicants have now recognised that where there the data processing operations being performed involve processing dependencies between the different data types being stored in a shared cache portion, the shared cache portion may potentially be prone to "deadlocks", wherein the shared cache portion becomes blocked in such a way that new data cannot pass through the cache, and the data processing operation(s) requesting data via the shared cache portion can no longer proceed (and thus stalls).

For instance, when a data processing operation requires some data, a lookup request is first issued to the cache to see whether or not that data is present in the cache. When the data is not present (a cache miss), a cache line is then allocated for receiving that data, and a request for that data is then issued to the memory system. The cache line may then be locked until the data for which the cache line is allocated has been used, such that whilst a cache line is locked, it cannot be evicted (or reallocated), and so no new data can be written to that cache line (at least until it is used, and unlocked, e.g. in the event of a successful cache hit for the data in the cache line, wherein the data can then be read out from the cache line for the data processing unit(s), and the cache line then evicted (or at least made available for eviction)). The data is thus transferred between the memory system and the data processing unit(s) via the cache.

If all of the cache lines within a particular portion of the cache (e.g. within a particular cache set) are locked, that portion of the cache is considered to be fully locked, and when a cache portion is fully locked, the cache lines within that cache portion cannot be allocated for new data (e.g., in response to any subsequent cache misses) until one of the cache lines in that portion is unlocked. So, any data that is already allocated for the locked cache lines in the shared cache portion may still be used by other data processing operations, when required, but the cache lines cannot be evicted to allow new data to be allocated until they are unlocked.

In normal use, as data processing operations progressively use the data in the cache, the respective cache lines are unlocked, and can thus be reallocated, and so on, to allow the data processing operations to progress.

However, when using a shared cache, and where there are processing dependencies between the different types of data that are stored in the shared cache, for example, such that the processing of data of the second type depends on the processing of data of the first type, there may be some instances wherein a data processing operation currently being performed by the data processing unit(s) requires data of the second type in order to be able to proceed, but wherein the shared cache portion is fully locked, e.g. by data of the first type, in such a way that the required data of the second type cannot pass through the cache. The data that is currently stored within the shared cache is thus effectively blocking the required data of the second type for the current data processing operation from entering the shared cache and passing into the data processing pipeline.

This may be the case where the data processing unit(s) are performing a sequence of data processing operations each involving data of both the first and second type. For instance, when the data of the first type for a first data processing operation has passed through the cache, a request may then be made for the corresponding second type of data for that data processing operation. However, when the shared cache portion is fully locked by data of the first type (for use by another data processing operation), the requested data of the second type for the first data processing operation is unable to pass through the shared cache. The first data processing operation cannot therefore complete. However, this means that the data processing unit(s) cannot then move onto the next data processing operation(s), and the data of the first type that is currently stored in the shared cache portion cannot be used and evicted from the shared cache portion.

That is, there may be some instances where data of the second type is required to be processed by the data processing unit(s) in order for the data processing unit(s) to be able to progress to a new data processing operation, and therefore for the data processing unit(s) to be able to use, and thus evict from the shared cache portion, the data (e.g. of the first type) that is currently stored in the shared cache portion. However, if, and when, all of the cache lines in the shared cache portion are currently locked, e.g. by data of the first type (or potentially be data of another different type), such that there are no cache lines in the shared cache portion that are available to be allocated for new data of the second type, the required data of the second type cannot pass through the cache to the data processing unit(s). In other words, there may be a circular dependency in the processing operation that is using the shared cache portion, which can result in the shared cache portion becoming deadlocked, thus stalling the data processing operation.

For instance, considering again the example of a shared intermediate (L1) cache for a cache system of a texture mapper within a graphics processing pipeline, depending on the implementation, there may be three different types of data (e.g., descriptors, headers for the compressed texture data, and compressed texture data) potentially being stored in the shared cache, with a corresponding hierarchy of processing dependencies between these data types. In particular, a successful cache lookup for a descriptor (a descriptor 'transaction') may generate a cache lookup request for the corresponding header data (a header transaction), which in turn once completed generates a cache lookup request for the associated compressed texture data (a data transaction). That is, the compressed texture data may be requested in response to the processing of corresponding header data, which in turn is requested in response to the processing of a corresponding descriptor. The processing of compressed texture data is thus dependent on the processing of header data, which is in turn dependent on processing of descriptors.

This means then that any data transactions that cannot pass through the shared cache portion may block header transactions in the graphics processing pipeline. In a similar fashion, both compressed data and header data in the cache may block descriptor transactions.

Accordingly, if, for example, all of the cache lines in a shared cache portion are locked by descriptors, and headers need to allocate data in the shared cache portion in order for the descriptors to continue to be processed in the pipeline (i.e. in order for the current data processing operation to complete such that the data processing unit(s) can move onto a new data processing operation requiring a new descriptor), there is a circular dependency that may result in a deadlock situation.

That is, in such cases, the processing pipeline may be waiting upon the header data for the current data processing operation. At the same time, the descriptors in the shared cache cannot be evicted until the header data is processed, such that the data processing unit(s) can move onto the next data processing operation, and so are waiting upon the processing pipeline. However, since the cache lines of the shared cache portion are fully locked by descriptors, it is not possible to allocate a cache line for the header data required to progress the data processing operation. The data processing operation therefore stalls upon this cache deadlock.

So, in embodiments of the technology described herein, there may be (at least) three kinds of processing dependencies with the data processing system. Firstly, there may be a direct dependency between data types, e.g. where the processing of a first data type generates data of a second type, the second data type depends on data of the first type. This type of dependency may result in a further dependency when the data is to be processed in a pipelined fashion, with each data type using a portion of the data processing circuitry (pipeline). Particularly, in that case, there are also dependencies in the data processing circuitry (pipeline), as a data processing operation for a given data type may need to wait for an earlier data processing operation of that type to complete before it can use the data processing circuit/circuitry for that data type. Finally, when the data is being transferred via a shared cache, there are also cache line dependencies (for example, where data of the second type wants to use a cache line that is currently locked by data of the first type, or a given type wants to use lines locked by that same type). A deadlock situation can thus result when these dependencies conflict in such a manner that no progress can be made.

(In fact, the processing dependencies between the data types may be different, or even more complex, than this (and for instance a single descriptor transaction may generate requests for multiple headers, etc.). However, in such cases the principles are essentially the same and the technology described herein can be applied in the same way to break any potential deadlock situations that may result from such processing dependencies when using a shared cache portion.)

Naturally, this problem of a shared cache potentially becoming deadlocked could be avoided by using separate caches for the different data types. However, this may then result in a reduced cache performance (since the benefits of using a shared cache would not then be achieved).

One approach for resolving such deadlocks within a shared cache might be to not lock the cache lines and to periodically evict lines from the shared cache portion, e.g. based on a suitable lifetime expiry policy. In this case a suitable mechanism may be used for retrying lookup requests to ensure that the data is eventually transferred. However, this approach may introduce latency and/or processing inefficiencies, e.g. where the same data has to be fetched and evicted multiple times before it is eventually used.

It might also be possible, in another approach, to try to actively (dynamically) track and manage which data types have been, and can be, allocated to which cache lines, e.g.

in order to prevent the cache lines being fully locked by data of a given type, in order to avoid the potential occurrence for such deadlocks. However, again, this approach may reduce the performance of the shared cache. This approach would also add considerable complexity to the cache system.

Further, this approach may not work in some cases, particularly as data may also (and in embodiments of the technology described herein at least types of data does) depend on data of its own type in a potentially complex manner (e.g., which may be the case at least for descriptor data in the intermediate (L1) cache of a texture mapper, depending on how the fetching of descriptor data from memory is implemented, such that descriptors in the shared cache can block other descriptors passing through the graphics processing pipeline).

By contrast, the technology described herein provides a more straightforward approach for resolving such deadlocks in a shared cache portion, involving relatively little additional complexity and/or area overhead, and still maintaining the benefits of using a shared cache portion.

In particular, in addition to the first, shared cache portion, a cache of the technology described herein includes a second cache portion that provides one or more 'extra' cache line(s) that are dedicated for data of the second type. So, in the event of the first, shared cache portion becoming fully locked, as discussed above, the shared cache portion can effectively be bypassed via the dedicated cache portion. The extra line(s) provided in the second, dedicated cache portion can thus break instances of circular processing dependencies between the different types of data stored in the shared cache portion that might otherwise cause the shared cache portion to become deadlocked, and the situation described above can thus be resolved.

The cache of the technology described herein thus includes, alongside the cache lines of the shared cache portion that are available for use for both the first and second data types, an extra cache line (or cache lines) that mimic a dedicated cache for the second data type, and which can therefore be used to ensure that any data of the second data type that may be required for a data processing operation that is currently being executed within the processing pipeline can pass through the cache even when the shared cache portion is blocked by other data, e.g. of the first type, relating to other data processing operations further back in the processing pipeline. In this way, the problem of the shared cache portion potentially becoming deadlocked and the processing pipeline stalling can be avoided without significantly impacting the performance of the shared cache portion in normal use.

For instance, during normal cache operations, and in an embodiment for most of the time, data (of any type) can simply be written to and read from the first, shared cache portion, e.g. in the usual fashion. However, in the event of a potential deadlock situation for the shared cache portion, of the type as described above, wherein new data of the second type cannot pass through the shared cache portion, the cache can continue to operate to transfer data of the second type using the dedicated cache portion, at least until cache line(s) in the shared cache portion are freed for allocation for new data (such that the deadlock has been resolved). For example, once the data that has passed through the cache via the second, dedicated cache portion has been processed, the data processing unit(s) can then move onto the next data processing operation, which may generate a cache lookup request for the data that is currently stored in the shared cache portion, and that data can then be read, and the respective cache line freed.

The dedicated cache portion thus provides a mechanism for breaking instances of circular dependencies that may result from the use of the shared cache portion during data processing operations having certain data dependencies.

Because the dedicated cache portion is in an embodiment only used in a worse-case scenario, e.g. to break a potential deadlock situation in the shared cache portion, whereas in normal use the cache operations can use the shared cache portion (for the increased cache performance offered thereby), the implementation of the dedicated cache portion is in an embodiment kept relatively simple.

For instance, the extra cache line(s) provided by the dedicated cache portion in an embodiment only require additional RAM space for the cache line(s), such that the extra cache line(s) can be added into the cache relatively cheaply, taking up relative little area and with relatively low complexity overhead. This means that the addition of the dedicated cache portion in an embodiment has minimal impact on the performance of the shared cache portion. For example, the shared cache portion of the cache is in an embodiment significantly larger than the dedicated cache portion, containing a much greater number of cache lines.

It will be appreciated that the dedicated cache portion never contributes to a deadlock situation because the extra cache lines in this portion will always eventually be unlocked. For example, because the cache lines of the second cache portion are dedicated for a particular data type, the second cache portion cannot become blocked by data of another type in the same way as a shared cache portion.

The technology described herein thus provides a cache that is configured to be able to handle a plurality of different data types, either using a shared cache portion (in normal use), or a dedicated cache portion (in cases where the shared cache portion cannot be used). The cache may be used to handle any number of different data types. Thus, the cache is not limited to handling only first and second different data types, but may be (and in an embodiment is) able to handle more than two, such as three or more, different types of data, and there may be additional processing dependencies between these further data types. For instance, in the example of a cache for a texture mapper discussed above the shared (L1) cache may handle three different types of data, with a series of hierarchical dependencies.

Thus, in embodiments, the shared cache portion is operable to store data of a plurality of different data types, having a hierarchy of processing dependencies, and wherein a respective dedicated cache portion is provided for each dependent data type.

It is also possible that the processing of at least some data types may be dependent on data of the same type. For instance, this may be the case where the data of that type is fetched into the cache from another higher level cache in the memory system. In such cases when there is no hit in the higher level cache, the higher level cache will typically be retried at a later point. However, even when the data is subsequently fetched into the higher level cache, it may be some time before the higher level cache is retried, in which time the data may have been evicted from the higher level cache (e.g., based on some lifetime expiry policy for that cache). In this case, the request for the data in the higher level cache could potentially never hit. To try to avoid this situation, and ensure that data is not evicted from the higher level cache before it has been used, special line states may be used for the cache lines in the cache that is requesting data from the higher level cache, and these can introduce certain complex processing dependencies for that data type, such that the data may block other data of the same type from passing through the cache.

One way to avoid such complex dependencies between data of the same type would be to hold in an intermediate buffer (such as a so-called "parking buffer") a record of the which data needs to be processed, such that in the event that that data cannot necessarily be fetched straightaway, e.g. because it has not yet been cached in a higher level cache, it can still be ensured that when that data is available in the higher level cache, it can then be fetched. In embodiments, such a parking buffer may be used for at least some of the data types.

In any case, in general, each possible processing dependency between data types stored in the shared cache portion could contribute to a potential deadlock situation. Thus, where the shared cache portion is configured to handle a plurality of different data types, with one or more processing dependencies between the data types, a further dedicated cache portion is in an embodiment provided for each dependent data type. In this way it can be ensured that any deadlocks that may occur when using the shared cache portion can be resolved using the respective dedicated cache portions.

(In fact, the cache could potentially operate entirely using the dedicated cache portions for the respective data types, with each dedicated cache portion effectively acting in parallel as a (small) dedicated cache for its respective data type. However, this would of course then lose the benefits offered by the first, shared cache portion, and would be inefficient since the majority of the cache, i.e. the first, shared cache portion, would not then be used, and in an embodiment the dedicated cache portions are only used as a fallback in order to break potential deadlocks.)

Thus, any references herein to a dedicated, or second, cache portion may in embodiments refer to any such further dedicated cache portion that is provided additionally to the shared cache portion, and having cache lines dedicated for any data type that may be held in the shared cache portion.

Where the cache is operable to handle 'n' different data types, with a hierarchical dependency chain (such that the processing of an nth data type is dependent on data of an n−1th data type, the processing of the n−1th data type is dependent on data of an n−2th data type, and so on), there are in an embodiment at least 'n−1' dedicated cache portions. In some embodiments, a dedicated cache portion may be provided for each data type (so for 'n' data types there may be a corresponding 'n' dedicated cache portions). Particularly, this may be the case when the processing of the highest data type in the hierarchical dependency chain (i.e. the first data type) can also be dependent on other data of the same data type. In that case, that data may potentially be blocked by other data of the same type and a dedicated cache portion for that data type is in an embodiment also provided in order to resolve any deadlock situations that may result from that dependency.

Typically, any data type(s) that do not depend on the processing of any other data type (and are thus 'independent'), do not require a dedicated cache portion, and to avoid taking up additional RAM space in the cache, are in some embodiments may therefore not be provided with any such dedicated cache portion. However, of course, a dedicated cache portion may be provided for any data type, and may offer some advantages at least in some situations (for example, when another shared resource of the cache, such as a cache interface, is currently blocked, in which case a dedicated cache portion may be used to bypass the cache interface).

It would also of course be possible to provide more than one dedicated cache portion for any particular data type. However, given that the dedicated cache portions are in an embodiment only used in a worse-case deadlock scenario, this may be generally less desired as it may be more desirable to keep the area for the dedicated cache portion(s) relatively low to allow the size of the first, shared cache portion to be maximised.

The addition of a second, dedicated cache portion thus prevents the possibility for deadlocks, whilst in an embodiment being very cheap, and not affecting the performance of the first, shared cache portion.

The data processing system of the technology described herein may generally comprise any suitable data processing system, e.g., wherein it may be desired to store different types of data within a shared cache, and wherein the shared cache may otherwise be prone to deadlocks due to processing dependencies between the different data types. Thus, the types of data that are being processed may comprise any suitable types of data having potentially cyclic processing dependencies of the type described above.

In an embodiment, the data processing system is a graphics processing system, or graphics processor. The data may thus be any suitable graphics data. In one embodiment, the data comprises texture data. The texture data that is being used in these embodiments may be any suitable and desired graphics texture. In embodiments, it represents an image (a frame) to be displayed. In such embodiments, the technology described herein may be used irrespective of the format of the texture data that is being used. Thus it can, for example, be used for both RGB (or RGBA) and YUV (and YUVA) texture data, as desired. In the case of a YUV texture, the YUV texture may be configured according to any desired and suitable chroma sub-sampling mode. In an embodiment it is configured according to one of the three modes: YUV444, YUV422 or YUV420. Other chroma sub-sampling modes may also be used.

Embodiments of the technology described herein can also be used with other texture formats, such as with textures that are used for depth and/or stencil data (values), and where graphics textures and texture processing are being used to store and process other forms of data (not just colours and images), if desired.

Embodiments of the technology described herein can correspondingly be used for any form of output that a graphics processing system may be used to generate. In an embodiment it is used when a graphics processing system is being used to generate images for display, but it can be used for any other form of graphics processing output, such as graphics textures in a render-to-texture operation, etc., that a graphics processing system may produce, as desired.

The data that is to be read into the cache may be any suitable (e.g. texture) data. In embodiments, the data may comprise compressed texture data. Depending on the compression scheme, in order to be able process (decompress) this compressed texture data, header data for the compressed texture data, as well as descriptors, may also need to be read into the cache. For instance, the compressed texture data, along with any required headers and descriptors, may be read into the cache from respective memory locations in the memory system, and then provided to suitable a data processing unit including suitable decompression circuitry for reconstructing the original texture data into a suitable format for inclusion into the texture cache from which it can then be passed into the texture mapper.

The data that is to be read into the cache may be stored in any suitable memory system. For instance, in embodiments, the different types of data may be stored in different locations within a main (system) memory of the data processing system. However, it is also contemplated that at least some types of data may be read into the cache from another (higher level) cache, or buffer, within the data processing system. Thus, the memory system may comprise any suitable data store or stores from which it may be desired to cache data.

The data that is read into the cache is ultimately transferred to one or more data processing unit(s) for use thereby during a data processing operation. The data processing operation may thus generate requests for data to be transferred from the memory system via the cache. That is, the data processing operation may first generate a cache lookup request to see whether the data is available in the cache. When the requested data is present in the cache, the data can then be provided to the data processing unit(s) for processing thereby. On the other hand, when the requested data is not present in the cache, the cache must first then fetch the data from the memory system (by issuing a memory request).

The data processing operations being performed by the data processing unit(s) may introduce various processing dependencies for the data that is potentially being stored in the cache. For instance, the data processing unit(s) may be part of a data processing pipeline, wherein data is used sequentially by the different stages of the pipeline. For example, the processing of a first data type during a data processing operation may then generate a cache lookup request for data of a second type, and so on. In that case, the processing of the second type can be considered to be dependent on the processing of the first data type. It is these processing dependencies that may result in a shared cache becoming deadlocked, in the manner described above.

The cache of the technology described herein includes a first cache portion that is operable as a shared cache resource for all of the data types being processed. That is, the cache lines of the first, shared cache portion can be considered to be available for allocation to any type of data (and are thus 'shared' between the different data types).

The first cache portion thus comprises a plurality of cache lines into which requested data (of any type) can be read from the memory for transfer to the data processing unit, e.g. in the usual fashion. For example, when data is required by the data processing unit(s), it is first checked whether that data is already stored in the cache (a cache "hit"), in which case the data can then be transferred to the data processing unit. On the other hand, when the data is not present in the cache (a cache "miss"), so long as there is a cache line available in the first cache portion, a cache line can be allocated for that data, and the data can then be read from the memory into that cache line. Once the cache line has been allocated, that cache line is in an embodiment then locked until that data is used (in the event of a cache hit), at which point the cache line is evicted and the data is transferred to the data processing unit.

In general, any suitable mechanism may be used for locking (unlocking) the cache lines. For example, in embodiments, reference counters may be used to lock cache lines, with the reference counter being incremented upon a cache lookup (i.e. when the cache line is allocated for data), and decremented after the data is read out from the cache. In such embodiments, the reference counters may also be incremented in the event of a cache miss on an already allocated line (e.g. where the line has been allocated but the data has not yet returned from memory), and also for cache hits (because the reference counter will be decremented upon data read out in that case too).

However, other arrangements of locking mechanisms would of course be possible.

In an embodiment, an identifier (or lookup key) is also stored in association with the first cache portion for use to identify the data in the first cache portion (e.g., that can be, and in an embodiment is, used to read the data from the first cache portion). The identifier may be provided in any suitable and desired way. That is, in an embodiment, the identifier is provided as a tag for the cache line(s) in question in which the data is stored. For instance, in an embodiment, the data that is stored in the first cache portion is identified (tagged) using an identifier that is indicative of the memory address where the data is stored in the (main) memory system.

During normal operation, and most of the time, data can thus be transferred to/from the cache using (only) the first, shared cache portion, which may operate as a shared cache resource, e.g. in the usual fashion.

Additionally to this shared cache portion, the cache of the technology described herein further comprises a second (or further) cache portion (or portions) comprising a set of one or more 'extra' cache lines that are dedicated for data of the second (or a further) data type. The second (or further) cache portion(s) thus provide 'extra' cache entries that effectively mimic a separate, dedicated cache for the respective data type. This means that if the shared cache portion is fully locked, e.g. by data of the first type, such that the shared cache portion may become deadlocked (e.g. due to a processing dependency of the second data type on data of the first type, as described above), it is possible to break the potential deadlock in the shared cache portion by bypassing the shared cache portion, and instead transferring data of the second (or further) type to the data processing unit(s) via its dedicated cache portion.

In an embodiment, the second (or further) dedicated cache portion(s) is used only as a fallback in order to avoid potential deadlocks. Thus, the implementation of the second (or further) dedicated cache portion(s) is in an embodiment kept relatively simple, and the second (or further) dedicated cache portion(s) in an embodiment comprises relatively fewer cache lines (compared to the first, shared cache portion). For example, the second (or further) dedicated cache portion(s) may contain only the minimum number of cache lines required to be able to handle data of its respective data type, which may even be only a single cache line (e.g. if the data type cannot span multiple cache lines).

In an embodiment, the extra cache line(s) of the second (or further) dedicated cache portion(s) are included in the cache immediately after the cache lines of the shared cache portion, and within the same RAM. That is, the first and second cache portions may comprise two portions of the same RAM. (It will be understood that the cache may also have additional RAMS, which may also comprise respective first and second cache portions of the type described herein.)

Thus, in embodiments, the dedicated cache portion is defined in the same set of RAM as the shared cache portion, wherein the cache line(s) of the dedicated cache portion are placed at the end of the cache lines of the shared cache portion.

However, other implementations would be possible. For instance, the second (or further) dedicated cache portion(s)

may be located elsewhere in the cache, e.g. using different RAM to the shared cache portion.

The second (or further) dedicated cache portion(s) is in an embodiment used (and in some embodiments only used) when the first cache portion is fully locked (or deadlocked) so that there are no cache lines in the first cache portion that can be allocated for new data. In an embodiment, rather than using the second (or further) dedicated cache portion(s) whenever it is determined that the shared cache portion is fully locked, the system waits, e.g. for a predetermined time period, or number of cycles, before using the second (or further) dedicated cache portion(s), as it may be that the lock is able to resolve itself (i.e. the shared cache portion is fully locked, but this is not a deadlock).

Thus, in embodiments, when the shared cache portion is fully locked so that no new data can be written to the shared cache portion, the system waits for a predetermined time period, or number of cycles, before using the dedicated cache portion. That is, the system waits before allocating a cache line of the dedicated cache portion for data.

It would also be possible for the system to recognise instances of a possible deadlock, e.g. where the shared cache portion is fully locked by data of a certain type, such that the progress of another data type in the data processing system is blocked, and upon such recognition to then use the second (or further) dedicated cache portion(s).

However, the second (or further) dedicated cache portion(s) may also be used in certain other situations, as desired. For instance, the second (or further) dedicated cache portion(s) may also be used in the event that the cache interface, which is in an embodiment a shared resource, is currently being used by requests for another data type. For example, when the cache interface is currently being used by a requests for data of the first type, and a new request for data of the second (or a further) type is made, that request may allocate a cache line in the second (or further) dedicated cache portion(s) (rather than waiting for the cache interface to become free).

Thus, in embodiments, when a request for data of the second type cannot access a cache-memory interface, because the interface is currently being used by a request for data of another data type, the request is processed using the dedicated cache portion.

It will be appreciated that the cache line(s) of the second (or further) dedicated cache portion(s) essentially operate as a dedicated cache for the respective data type. Thus, the second (or further) dedicated cache portion(s) essentially operates, by itself, in the usual fashion, e.g. with the cache line(s) being allocated for data in response to a request for data using the second (or further) dedicated cache portion(s), and then locked until that data is used. For instance, the cache lines of the second (or further) dedicated cache portion(s) may move between various different states during use, including, for example: an 'allocated' state, in which the cache line has been allocated for data, and is therefore locked; an optional 'requested' state, in which a memory request for the allocated data has been generated, but the data has not yet been received, and the cache line is still locked; a 'valid' state, in which the data is received; and an 'invalid' state, wherein the cache line is unlocked and available for (re)allocation.

In embodiments, even where the second (or further) dedicated cache portion(s) contains more than one cache line, such that it would be possible to simultaneously hold multiple different data entries, all of the cache lines in the second (or further) dedicated cache portion(s) are in an embodiment locked (or unlocked) together. That is, when a cache line of the second (or further) dedicated cache portion(s) is allocated, in an embodiment all of the cache lines in the dedicated cache portion are then locked, and only unlocked together once that cache line has been evicted.

Thus, the cache line(s) of the second (or further) dedicated cache portion(s) are in an embodiment put into a 'valid' state from the time at which the requested data that is using the second (or further) dedicated cache portion(s) is fetched until the time at which that data is read, at which point the cache line(s) of the second (or further) dedicated cache portion(s) are automatically invalidated. The cache line(s) of the second (or further) dedicated cache portion(s) are thus in an embodiment locked from the time they are allocated until the time that they are invalidated.

Thus, in embodiments, once a cache line of the dedicated cache portion has been allocated for data, the dedicated cache portion is in an embodiment then locked (and in an embodiment such that it cannot be used by any other operations) until that data has been transferred to the data processing unit(s).

In other words, the second (or further) dedicated cache portion(s) is in an embodiment 'single-use', i.e. and can only process one memory request at a time, in a strictly serial manner (although it will be appreciated that where multiple dedicated cache portions are provided, for a plurality of data types, these may be used separately, and in parallel, with one another). That is, the second (or further) dedicated cache portion(s) in an embodiment (only) supports one entry per data type.

In this way, the lookup logic for the second cache portion can advantageously be kept relatively simple. Further, this generally works well because it is relatively unlikely that consecutive transactions will need to use the second (or further) dedicated cache portion(s), and so in most cases it is acceptable for the second (or further) dedicated cache portion(s) to remain locked until the transaction using the second (or further) dedicated cache portion(s) has completed.

For instance, this means that (unlike in a more conventional cache, or indeed the cache lines of the first, shared cache portion) it is not necessary to include any tags identifying the data location for any data allocated to the cache lines of the second (or further) dedicated cache portion(s).

In an embodiment, therefore, the cache lines of the second, dedicated cache portion (and any further such dedicated cache portions provided additionally to the first, shared cache portion) are not associated with any tags. There is then no need to lookup the tags, or carry this information through the cache interface, etc. The use of such 'tag-free' cache entries helps to reduce the complexity of the cache, and the extra cache lines in the second (or further) cache portion(s) can be provided very cheaply.

To facilitate such tag-free operation, any requests to the memory system for data to be fetched into the cache In an embodiment contain an indicator identifying whether the memory request (transaction) is using the second (or further) dedicated cache portion(s). Thus, in embodiments, when a cache line of the dedicated cache portion has been allocated for data, a request to the memory system for that data includes an identifier indicating that the dedicated cache portion is being used.

In this way, the system can therefore track which transactions are using the second (or further) dedicated cache portion(s), so that the data, once fetched into the cache, can be read accordingly from the second (or further), dedicated cache portion without the need for any tags, or other identifiers, in the cache. For example, when the cache line(s) of the second (or further) cache portion(s) are allocated for some new data, the request to memory for that data can include a suitable indicator identifying that the request is for the second (or further) cache portion(s) (rather than the first, shared cache portion). The indicator may, for example, comprise a bit indicating that the second (or further) cache portion(s) is being used, as well as the address in the cache (RAM) for the cache line(s) of the second (or further) cache portion(s) that include the data.

However, other implementations for tracking which requests are using the second (or further) cache portion(s) would of course be possible. For instance, in another approach, dedicated circuits/circuitry may be provided for tracking which requests are using the second (or further) cache portion(s).

Of course, it would also be possible for the second (further) cache portion to also use tags. For instance, this may allow for more complicated cache operations to be performed using the second (or further) cache portion(s), e.g. involving multiple lookups of the data stored in the second (further) cache portion(s). It would also be possible to use a larger second (or further) cache portion, or to provide multiple such dedicated cache portions for a particular data type. These approaches may make sense if it is found that the second (or further) cache portion(s) is used very often. However, in most cases, it is expected that the second (or further) cache portion(s) will rarely be used, and the first, shared cache portion will be used for most data processing operations.

As with the first, shared cache portion, any suitable mechanism may be used for locking/unlocking the cache lines of the second (or further) cache portion(s). The mechanism for the cache lines of the second (or further) cache portion(s) could be the same as for the cache lines of the first, shared cache portion, or could be different. Where a plurality of dedicated cache portions are provided, for different data types, these may each be locked/unlocked (independently) using either the same or different mechanisms.

It will be appreciated that where a single data transaction involves multiple lookups, that data transaction may use both cache lines from the shared cache portion, and also cache lines from the dedicated cache portion.

As will be appreciated from the above, the technology described herein is in an embodiment implemented in a system comprising a memory system, a cache system, and a graphics processing unit (GPU) (a graphics processor). Texture data for a render output (e.g. image to be displayed) is in an embodiment stored in a memory of the memory system. The GPU is in an embodiment arranged to fetch required texture data from the memory and to store it in the cache system, in the manner described above. The GPU then in an embodiment reads required texture data from the cache system for generating the render output (e.g. in the manner described above). The render output, once generated in this way, is then in an embodiment displayed, e.g. on a display such as a digital television, computer screen or the like.

The graphics processing unit (graphics processor) will, and in an embodiment does, implement and execute a graphics processing pipeline to perform graphics processing.

In an embodiment, the data, e.g. graphics, processing system includes a host processor that executes applications that can require, e.g. graphics, processing by the data, e.g. graphics, processing unit(s). The system in an embodiment further includes appropriate storage (e.g. memory), caches, etc.

The technology described herein can be used in and with any suitable and desired data, e.g. graphics, processing system and processor.

As one example, the technology described herein may be used with tiled renderers (tile-based graphics processing systems). Thus, in an embodiment, the graphics processor (processing pipeline) is a tiled-based graphics processor (processing pipeline).

However, other arrangements would of course be possible.

The graphics processing unit (processor) (processing pipeline) can include, and in an embodiment does include, any one or more, and in an embodiment all, of the processing stages that a graphics processor (processing pipeline) can normally include. Thus, for example, the graphics processing unit in an embodiment includes a primitive setup stage, a rasteriser and a renderer. In an embodiment the renderer is in the form of or includes a programmable fragment shader (a shader core).

The graphics processor (processing pipeline) in an embodiment also comprises one or more programmable shading stages, such as one or more of, and in an embodiment all of, a vertex shading stage, a hull shader, a tessellation stage (e.g. where tessellation is performed by executing a shader program), a domain (evaluation) shading stage (shader), a geometry shading stage (shader), and a fragment shader.

The graphics processor (processing pipeline) may also contain any other suitable and desired processing stages that a graphics processing pipeline may contain such as a depth (or depth and stencil) tester(s), a blender, a tile buffer or buffers, a write out unit etc.

In an embodiment, the various functions of the technology described herein are carried out on a single graphics processing platform that generates and outputs the rendered fragment data that is, e.g., written to the frame buffer for the display device.

The data, e.g. graphics, processing system and/or processor in an embodiment also comprises, and/or is in communication with, one or more memories and/or memory devices that store the data described herein, and/or that store software for performing the processes described herein. The data, e.g. graphics, processing system and/or processor may also be in communication with a host microprocessor, and/or with a display for displaying images based on the data generated by the data, e.g. graphics, processor (processing pipeline).

The technology described herein can be implemented in any suitable system, such as a suitably configured microprocessor based system. In some embodiments, the technology described herein is implemented in computer and/or micro-processor based system.

The various functions of the technology described herein can be carried out in any desired and suitable manner. For example, the functions of the technology described herein can be implemented in hardware or software, as desired. Thus, for example, the various functional elements, and stages of the technology described herein may comprise a suitable processor or processors, controller or controllers, functional units, circuitry, circuits, processing logic, microprocessor arrangements, etc., that are operable to perform the various circuits, functions, etc., such as appropriately dedicated hardware elements (processing circuits, or circuitry) and/or programmable hardware elements (processing circuits, or circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Furthermore, any one or more or all of the processing stages of the technology described herein may be embodied as processing stage circuitry, e.g., in the form of one or more fixed-function units (hardware) (processing circuits/circuitry), and/or in the form of programmable processing circuits/circuitry that can be programmed to perform the desired operation. Equally, any one or more of the processing stages and processing stage circuits/circuitry of the technology described herein may be provided as a separate circuit element to any one or more of the other processing stages or processing stage circuits/circuitry, and/or any one or more or all of the processing stages and processing stage circuits/circuitry may be at least partially formed of shared processing circuitry.

It will also be appreciated by those skilled in the art that all of the described embodiments of the technology described herein can include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

An example of the technology described herein will now be described with reference to the processing of texture data within a graphics processing system. For instance, it is common in graphics processing systems to generate data values (e.g. colours) for sampling positions in a render output (e.g. an image to be displayed) by applying so-called textures or texture data to the surfaces to be drawn. Such textures are typically applied by storing an array of texture elements ("texels"), each representing given texture data (such as colour, luminance, and/or light/shadow, etc., values), and then mapping the texels onto corresponding elements, such as (and typically), a set of sampling positions, for the render output in question.

Thus, a graphics texture will typically be configured as an array of data elements (texels), each having a corresponding set of texture data stored for it. The texture data for a given position within the texture is then determined by sampling the texture at that position.

When texture data is needed by a graphics processor, e.g. when rendering an image to be displayed, the texture data required for the rendering process is usually first fetched from the (main) memory where it is stored and loaded into a cache accessible to the graphics processor, with the graphics processor (the rendering pipeline implemented by the graphics processor) then reading the texture data from the cache for use.

FIG. 1 shows an exemplary data processing system in which the technology described herein and the present embodiment may be implemented.

The exemplary data processing system shown in FIG. 1 comprises a host processor comprising a central processing unit (CPU) 57, a graphics processing unit (GPU) 10, a video codec 51, a display controller 55, and a memory controller 58. As shown in FIG. 1, these units communicate via an interconnect 59 and have access to an off-chip memory system (memory) 20. In this system the GPU 10, video codec 51, and/or a CPU 57 will generate frames (images) to be displayed, and the display controller 55 will then provide the frames to a display 54 for display.

In use of this system, an application 52, such as a game, executing on the host processor (CPU) 57, will, for example, require the display of frames on the display 54. To do this, the application 52 will submit appropriate commands and data to a driver 61 for the graphics processing unit 10 that is executing on the CPU 57. The driver 61 will then generate appropriate commands and data to cause the graphics processing unit 10 to render appropriate frames for display and to store those frames in appropriate frame buffers, e.g. in the main memory 20. The display controller 55 will then read those frames into a buffer for the display from where they are then read out and displayed on the display panel of the display 54.

The present embodiments and the technology described herein relate in particular to the situation where the graphics processing unit 10 is using a texture when rendering a frame for output (e.g. for display). Such textures will comprise arrays of data elements (texture elements (texels)), each having an associated data value or values in the data format of the texture in question.

The textures will typically comprise images that are to be applied to graphics entities, such as primitives, to be rendered, and will normally be stored in the off-chip memory 20 from where they can then be read in by the GPU 10 when required. In particular, when using a texture to generate a render output, the GPU 10 will fetch the texture data from the memory 20 and store it in a local, texture cache of the GPU 10. The texture data will then be read from the texture cache, when needed, and used to generate the render output, e.g. frame for display.

Figure 2:
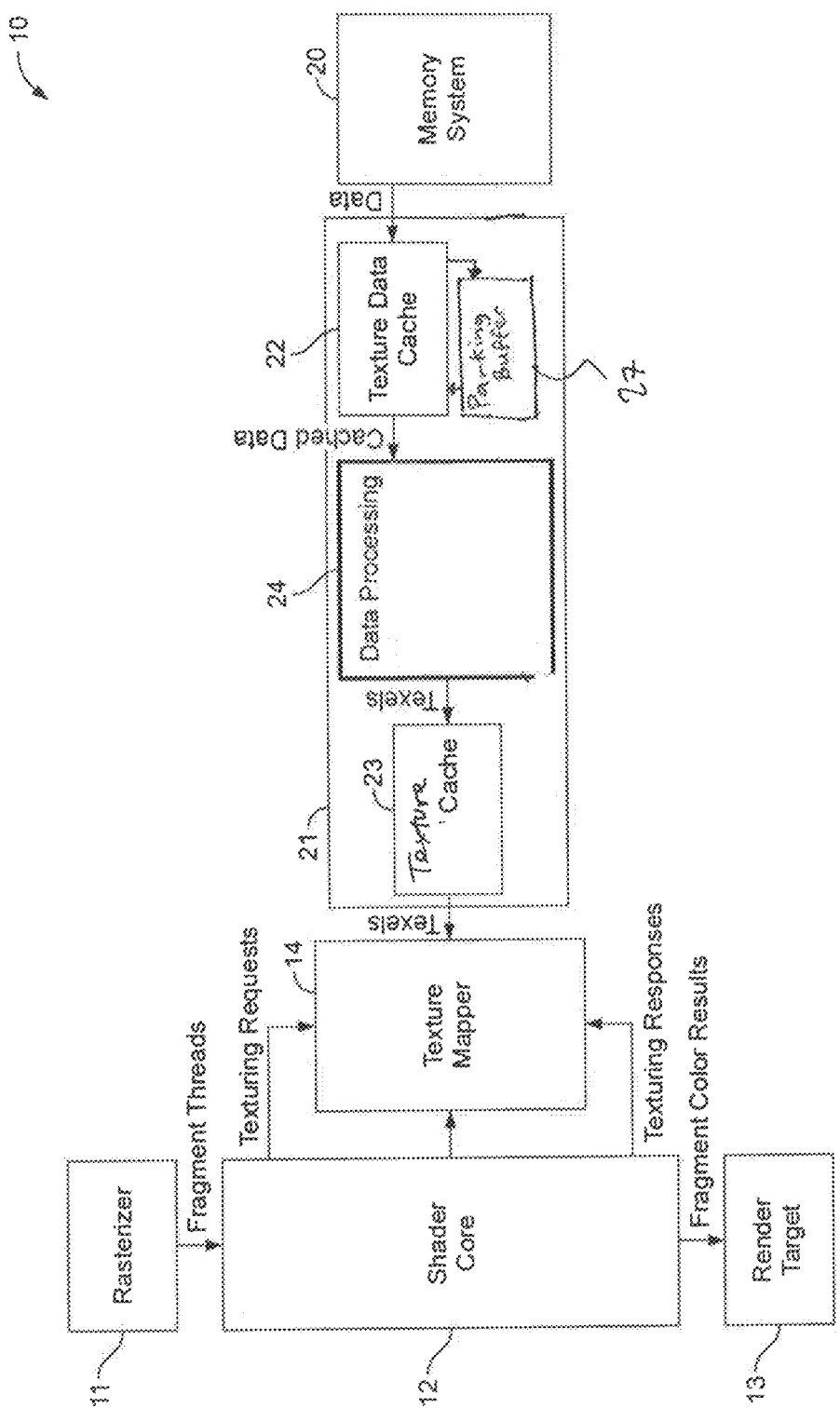
FIG. 2 shows schematically a graphics processing pipeline for use within a data processing system like that shown in FIG. 1.
Figure 3:
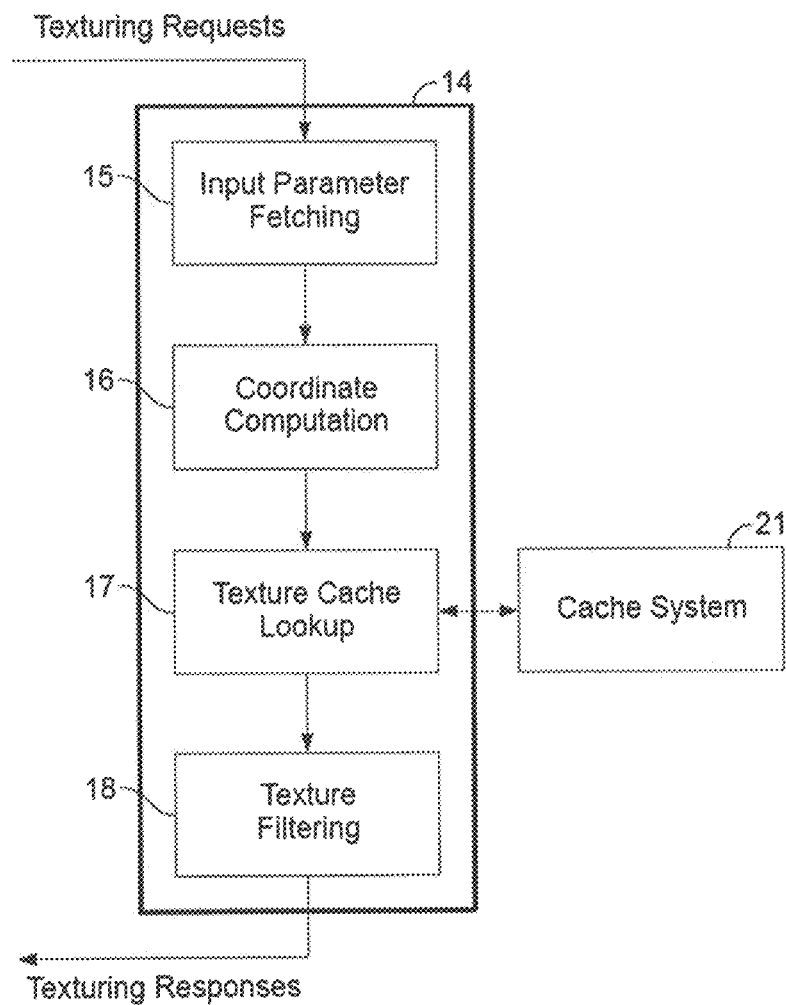
FIG. 3 shows in more detail the texture mapper of the graphics processing pipeline of FIG. 2.

FIGS. 2 and 3 shows schematically the elements of the graphics processing unit 10 of the system shown in FIG. 1 that are relevant to the operation of the present embodiments. As will be appreciated by those skilled in the art, there may be other elements of the graphics processing unit 10 that are not illustrated in FIGS. 2 and 3.

In the present embodiment, the GPU 10 is a tile-based graphics processor. However, other arrangements would, of course, be possible.

As shown in FIG. 2, the graphics processing unit 10 implements a graphics processing pipeline that includes, inter alia, a rasterizer 11, a renderer in the form of a (programmable) shader core 12, a buffer 13 (which may, e.g., reside in memory 20) for storing the output render target (e.g. frame to be displayed), and a texture mapper 14, and is in communication with the memory system 20.

The system memory 20 will store, inter alia, graphics textures to be used by the GPU 10. The system memory 20 may, e.g., be a disk drive or other storage medium (e.g. a hard disk, a RAID array of hard disks or a solid state disk) of or accessible to the host system in which the graphics processing unit 10 is located, and may be an internal storage medium of the host system, or an external or removable storage medium.

As shown in FIG. 3, the texture mapper 14 may comprise, for example, an input parameter fetching unit 15, a coordinate computation unit 16, a texture cache lookup unit 17, and a texture filtering unit 18.

The arrows in FIGS. 2 and 3 indicate the main ways in which data flows between the various components of the graphics processing pipeline and the memory 20. There may also be other communication routes or directions that are not indicated.

The rasterizer 11 receives as its input primitives (e.g. triangles) to be used to generate a render output, such as a frame to be displayed, and rasterizes those primitives into individual graphics fragments for processing. To do this, the rasterizer 11 rasterizes the primitives to sample points representing the render output, and generates graphics fragments representing appropriate sampling positions for rendering the primitives. The fragments generated by the rasterizer 11 are then sent onwards to the shader core (renderer) 12 for shading.

The shader core 12 executes a shader program or programs for the fragments issued by the rasterizer 11 in order to render (shade) the fragments. The shader programs may have no, one, or more, texturing instructions (texturing operations) that are required to be executed by the texture mapper 14. When a texturing instruction is encountered by the shader core 12, a texturing message is sent from the shader core 12 to the texture mapper 14, instructing the texture mapper 14 to follow one or more texturing instructions. After the texture mapper 14 has finished its texture processing (carrying out these instructions), the final result is sent back to the shader core 12 in a response message for use when shading the fragment in question. (Although for ease of illustration the texture mapper 14 is shown here as a separate unit, it will be understood that in embodiments the texture mapper 14 may also be part of the shader core 12.)

The texture mapper 14 includes suitable processing circuitry to perform texturing instructions. This processing circuitry may, e.g., be in the form of a dedicated hardware element that is configured appropriately, or it may, e.g., comprise programmable processing circuitry that has been programmed appropriately. In an embodiment, a dedicated hardware texture mapper is used.

The "shaded" fragment from the shader core 12 is then stored as part of the output render target in the buffer 13, e.g. the main memory 20, e.g. for subsequent display.

Thus, when instructed by the shader core 12, the texture mapper 14 reads textures from the memory 20 (as required), performs various processing steps, and returns a colour sampled from the texture back to the shader core 12.

As part of this processing, the input parameter fetching unit 15 may, for example, read in the parameters of the texture to be sampled and the parameters of how to sample the texture from appropriate state information for the texture.

The coordinate computation unit 16 may, for example, receive the texturing request message from the shader core 12 containing the coordinates to sample in the texture (e.g. given in a normalized coordinate-system where (0.0, 0.0) is the top-left corner of the texture and (1.0, 1.0) is the bottom-right corner of the texture), together with the parameters read by the input parameter fetching unit, and determine the actual texel indices in the texture.

As shown in FIG. 2, the texture mapper 14 interfaces with the memory system 20 via a cache system 21.

The texture cache lookup unit 17 may, for example, check whether the required texture data is stored in the cache system 21 for the texture mapper 14 and, if present, read the texture data from the cache system 21.

For a typical bilinear lookup, texture data from four texels are read from a 2×2 texel region of the texture. The texture filtering unit 18 may, for example, receive the four texels of the bilinear lookup from the texture cache lookup unit, and determine interpolation weights and compute a weighted average of the texture data for the sampling position in question. This is then output to (returned to) the shader core 12.

The operation of the cache system 21 in the present embodiments will be discussed in more detail below.

As shown in FIG. 2, the cache system 21 contains a first (e.g.) L1 cache 22 that receives data from the system memory 20, and a second cache 23 (a "texture" (or "texel") cache) that interfaces with the texture mapper 14 and from which the texture mapper 14 may read data of texels required for its texturing operations. The first 22 and second 23 caches of the cache system 21 are local memory for storing texture data, and may, e.g., comprise a RAM. They may be in the form of an SRAM memory. They each comprise a plurality of cache-lines.

The cache system 21 also includes a data processing unit 24 that is operable to read texture data from the L1 cache 22, process the data, and then provide that data to the texture cache 23.

For instance, in order to reduce storage requirements, the texture data is typically stored in the memory system 20 in a compressed format. Depending on the compression scheme, the texture data may thus include the compressed texture data itself, as well as various headers and descriptors associated with compressed data, and that may be required in order to reconstruct the original (uncompressed) texture data that is ultimately to be used by the texture mapper 14.

The compressed texture data thus needs to be decompressed prior to it being provided to the texture mapper 14. Accordingly, as shown in FIG. 2, the compressed texture data may be first loaded into the L1 cache 22 that interfaces with the memory system 20. This data can be passed from the L1 cache 22, along with its associated descriptors and headers, into suitable data processing circuitry 24 in order for the compressed texture data to be decompressed and converted into a suitable format for the texture mapper 14. The formatted texture data is then loaded into the texture cache 23 ready for access by the texture mapper 14.

Thus, in the present embodiments, the first cache 22 (the L1 cache) of the texture cache system 21 stores the texture data as a copy of the bits of the texture data as stored in the memory system 20, in its compressed format. Each cache line of the first cache 22 (at least for the shared portion thereof, as explained later) is tagged with the memory address of the first byte in the cache line. Thus, the cache lines of the first cache 22 can store a cache-line's amount of texture data from contiguous addresses in the main memory of the memory system 20.

On the other hand, the second cache 23 (the texture cache) of the texture cache system 21 stores the texture data grouped as respective texels, and stores each texel using one of a set of particular, predefined, supported texel data formats. The second cache 23 thus typically has a greater capacity than the first cache 22. Examples of such formats would be, for example, R5G6B5, R4G4B4A4, R8G8B8A8, Y8U8V8A8, Y16U16V16A16, and so on (where the letter indicates the data channel and the number indicates the number of bits stored for that data channel). Other formats for the texture data of a texel could be used, if desired.

Thus, when using YUV texture data, the texture data is stored in the second cache 23 of the texture cache system 21 such that the YUV texture data for a particular texture position (area) is grouped together into texels as a basic unit of storage, with each texel containing the chroma (U and V) and associated luma (Y) data for the texture position (area) in question.

The data processing circuitry 24 takes the data from the first L1 cache 22 and converts it into a suitable format for inclusion into the texture cache 23. This processing basically involves unpacking the compressed texture, using its associated headers and descriptors, in order to reconstruct the original (uncompressed) texture data, e.g. texels.

Figure 4:
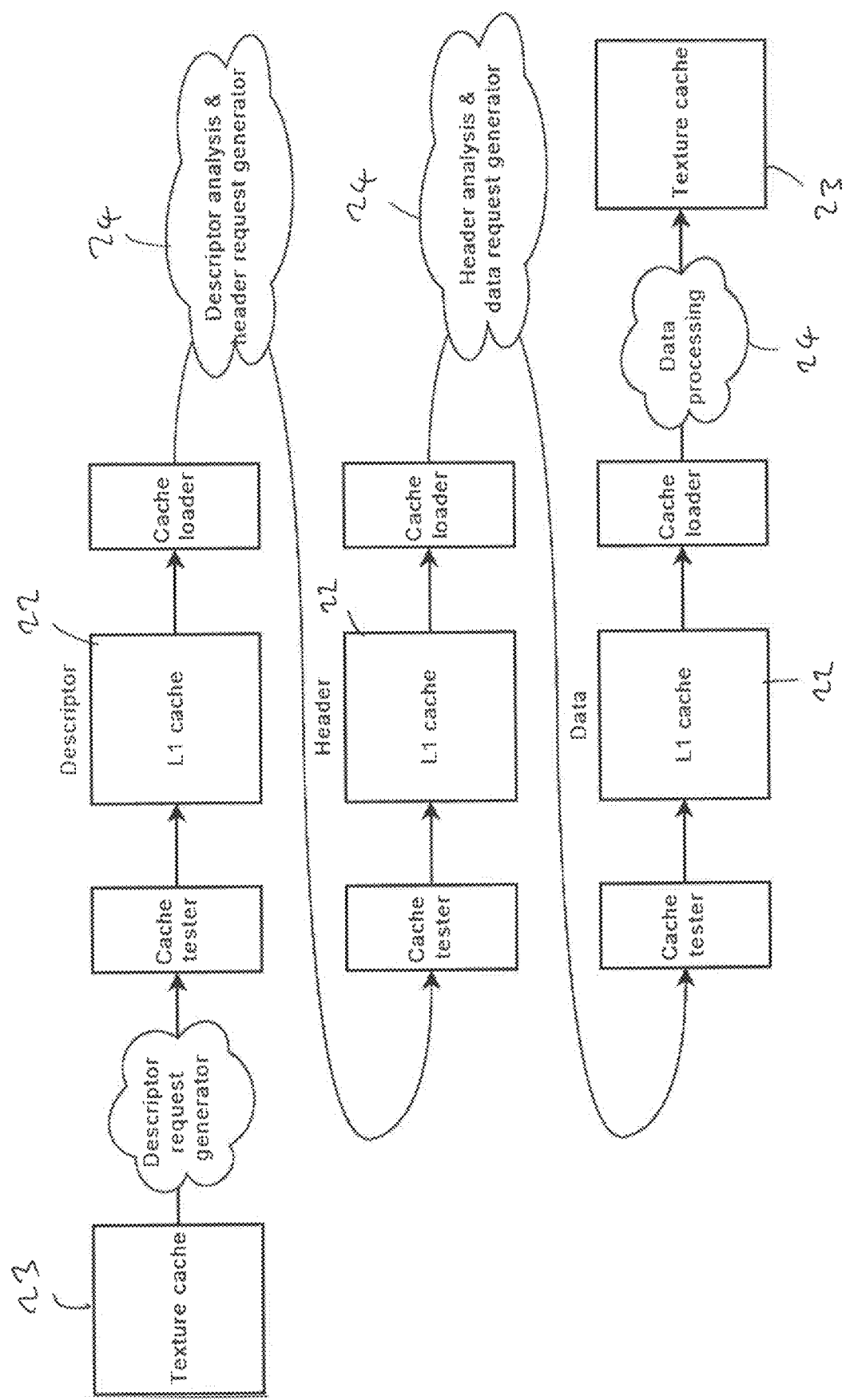
FIG. 4 schematically illustrates the operation of a cache system of the texture mapper showing the potential processing dependencies between the different data types that are being cached.

The data processing operations being performed by the data processing circuitry 24 thus typically involve sequentially processing descriptors, headers and compressed texture data. An example of this processing pipeline is illustrated schematically in FIG. 4. Particularly, as shown in FIG. 4, in order to populate the texture cache 23, the texture cache 23 first generates a descriptor lookup request, which is then processed by a cache tester for the L1 cache 22, and either read into the data processing circuitry 24 (if the requested descriptor is available already in the L1 cache 22), or requested from the memory system 20 (if the requested descriptor is not available in the L1 cache 22). Once the requested descriptor has been obtained via the L1 cache 22, it can then be provided to the data processing circuitry 24, and the data processing circuitry 24 then analyses the descriptor and generates a lookup request for the corresponding header. The header data is then obtained via the L1 cache 22 in a similar fashion, and in turn generates a lookup request for the associated compressed texture data. Once the associated compressed texture data has been obtained from the L1 cache 22, the data processing circuitry 24 is then able to combine this with the descriptor and header in order to decompress the texture data into a format suitable for the texture cache 23.

There is thus a dependency chain between the different types of data that are passing through the shared L1 cache 22. In particular, the processing of the compressed texture data is dependent on the processing of header data, which is in turn dependent on descriptor data.

Figure 5:
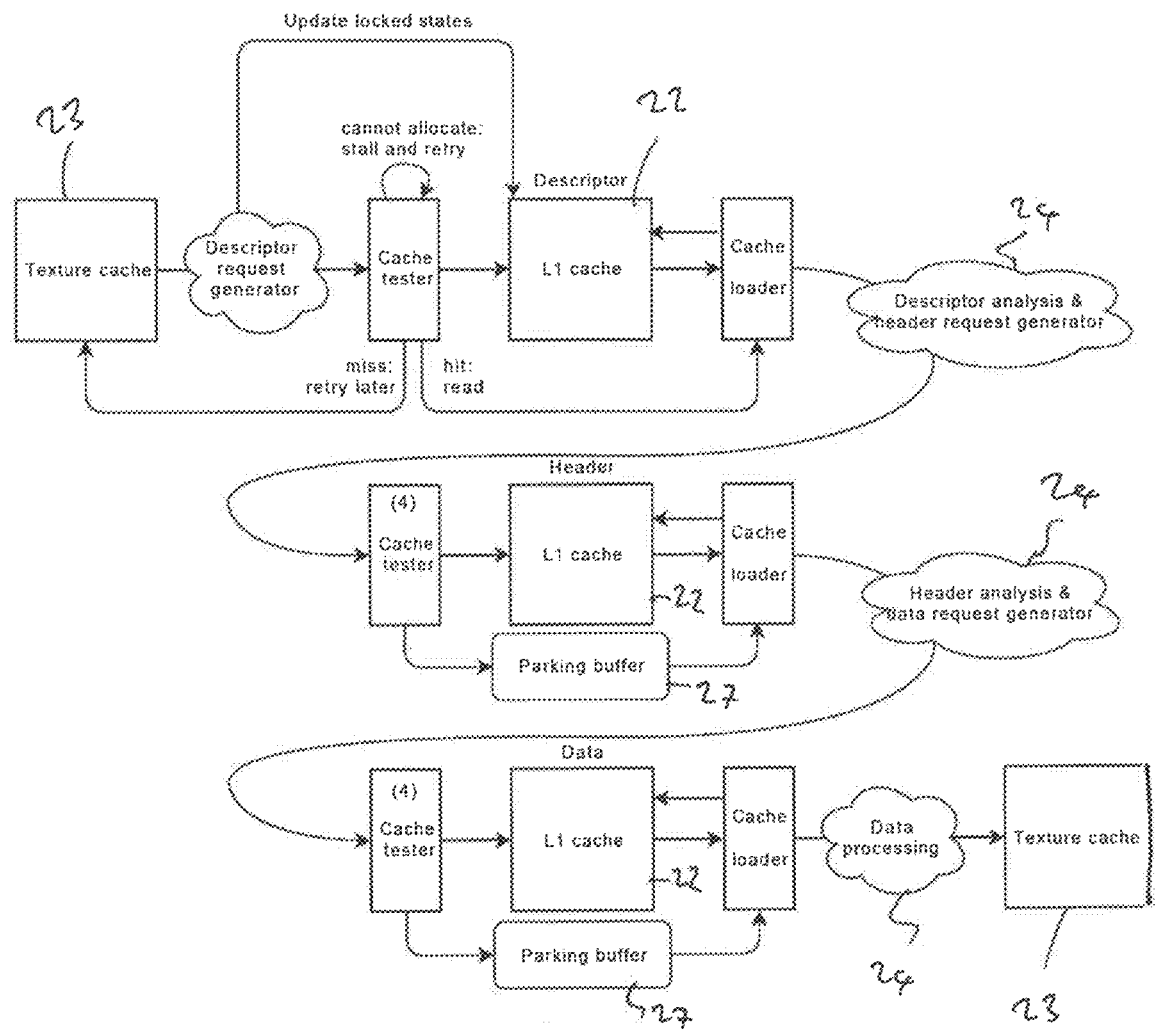
FIG. 5 shows an example of the operation of the cache system of FIG. 4 in more detail.

In some cases, the processing of the descriptor data may also be dependent on other descriptor data. An example of this situation is illustrated in FIG. 5. As shown in FIG. 5, a parking buffer 27 is used for tracking requests for header data and also for the compressed texture data. This means that the cache is able to track using the parking buffer which data has been requested, but not yet fetched, and to ensure that this data is eventually obtained.

However, in the example shown in FIG. 5, a parking buffer is not used for tracking the descriptors. Instead, the processing of the descriptors uses the cache line locked states, and a suitable retry mechanism for periodically attempting to fetch the requested descriptors. There is a signal updating the cache line locked states, which causes all the cache lines to transition when this signal is active. The signal is active only when a full scan of the texture cache completes. Because the signal causes all of the cache lines to transition together, once the texture cache has been fully scanned, this means that the processing of descriptor data may have to wait upon the processing of other descriptor data, such that there is a potentially complex dependency between different descriptors. However, once the processing of the descriptors has completed, the headers and compressed texture data can then be processed, using a parking buffer based waiting mechanism.

The Applicants have recognised that in such cases, where the processing of the data in the shared cache involves various processing dependencies, the shared cache may be prone to deadlock situations, as will be explained further below for the example of the shared L1 cache 22. The technology described herein provides a mechanism for avoiding such deadlocks, whilst still maintaining the benefits of a shared cache, and with relatively low modification to the cache.

Figure 6:
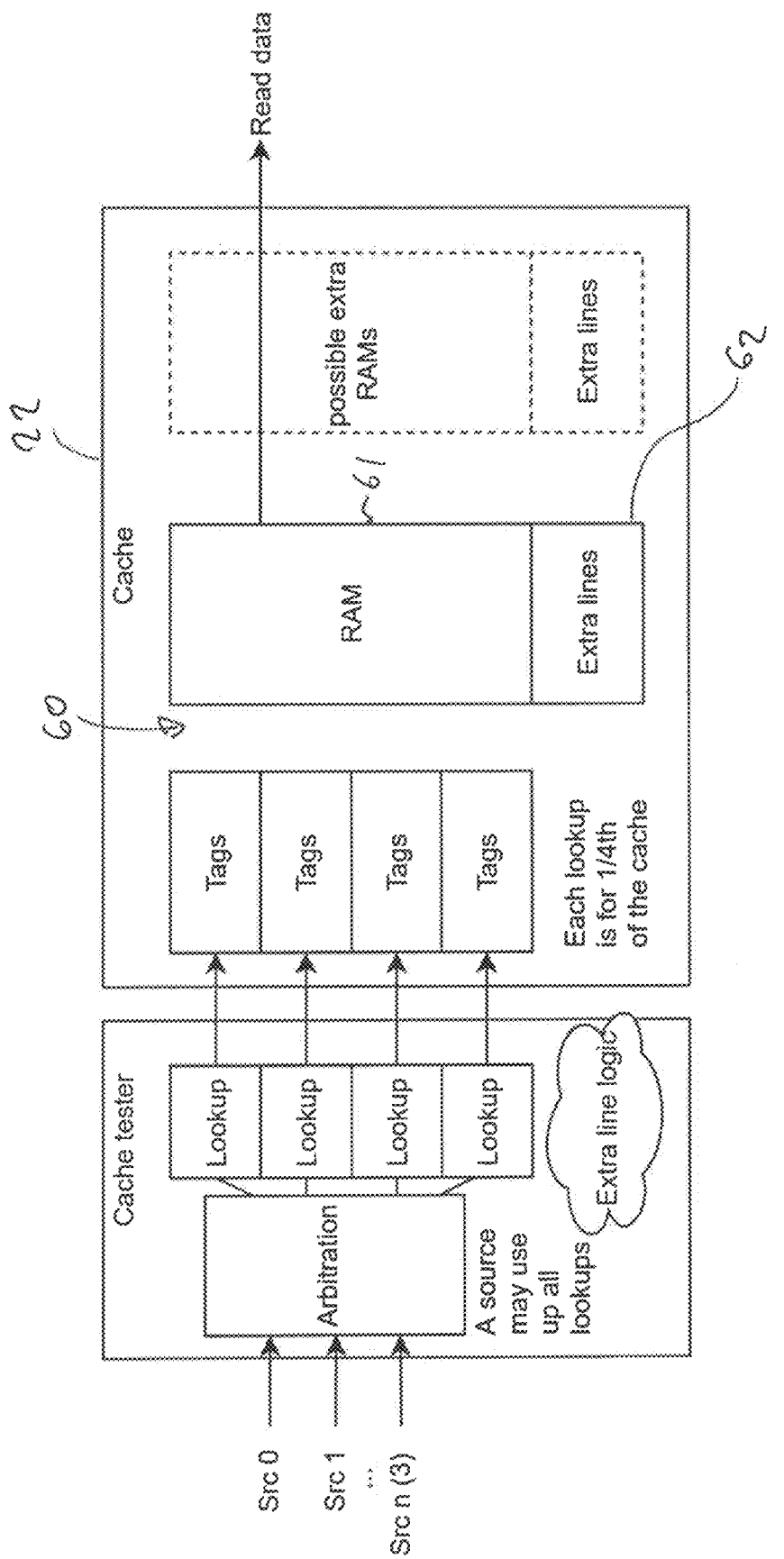
FIG. 6 shows an example of a cache according to an embodiment of the technology described herein including a shared cache portion.

FIG. 6 shows an example of the L1 cache 22 according to an embodiment of the technology described herein. As shown in FIG. 6, the L1 cache 22 may include a number of (e.g. four) groups each having its own RAM space. For instance, in the example shown in FIG. 6, there are four groups (or "sub-caches") that each use a quarter of the RAM 60. That is, the L1 cache 22 may be divided into a number of (e.g. four) different groups into which memory address can be mapped. Each group comprises a number of tags, divided into sets, that can be looked up by indicating which set to check within the group and which tag to look for in that set. This enables four lookups to be performed per cycle (e.g. one per sub-cache). However, other arrangements would of course be possible and any number of lookups (e.g. one, four, eight, etc.) may be performed per cycle.

These lookups may involve any of the three data types, and a transaction for any of the data types may involve any number of lookups. For instance, in one example, descriptors and headers may each carry one lookup, whereas a single data transaction may carry out four lookups. However, all the data types could carry out four lookups for a single transaction, if desired. Other arrangements would of course be possible. A suitable arbitration mechanism, e.g. round robin, ensures that all sources can eventually access the sub-caches.

Each RAM 60 is divided into a first shared portion 61 that comprises a plurality of cache lines that are available for allocation for data of any type, and a second dedicated portion 62 comprising a number of 'extra' cache entries that are dedicated for data of a particular type.

A dedicated cache entry is provided for each dependent data type. That is, for the example shown in FIG. 5, wherein the compressed texture data depends on header data, which in turn depends on descriptor data, which also depends on itself, a dedicated cache entry is provided for each data type. Each dedicated cache entry comprises relatively few cache lines, generally being only the minimum number of cache lines required for handling a single data transaction of that data type. For example, if the descriptor and header transactions generate only a single lookup, only a single dedicated cache line may then need to be provided for these data types. On the other hand, if a transaction generates multiple lookups, or wherein the required data of that type may span multiple cache lines, multiple cache lines (e.g. four) may be provided.

To keep the implementation simple, and to allow the shared cache portion 61 to operate essentially as normal, the 'extra' lines may be provided using the same portion of RAM, in a contiguous fashion with the shared cache lines. Thus, as shown in FIG. 6, a number of 'extra' cache entries are provided after the portion of RAM that is used for the normal, shared portion of the L1 cache 22. For instance, if the shared portion of the RAM has 64 entries (from 0 to 63), an entry could be added for the descriptor at line 64, for the header at line 65, and at lines 66 onwards for the data.

Other arrangements for storing the extra cache entries would of course be possible.

Thus, in response to a cache lookup request, it is first checked whether the data is available in the L1 cache 22. If the data is available (a cache hit), it can then be read out from the cache. On the other hand, if the data is not available (a cache miss), so long as there is an available line in the cache, a cache line is allocated for the data, and the cache then issues a request for that data to the memory system 20.

Figure 7:
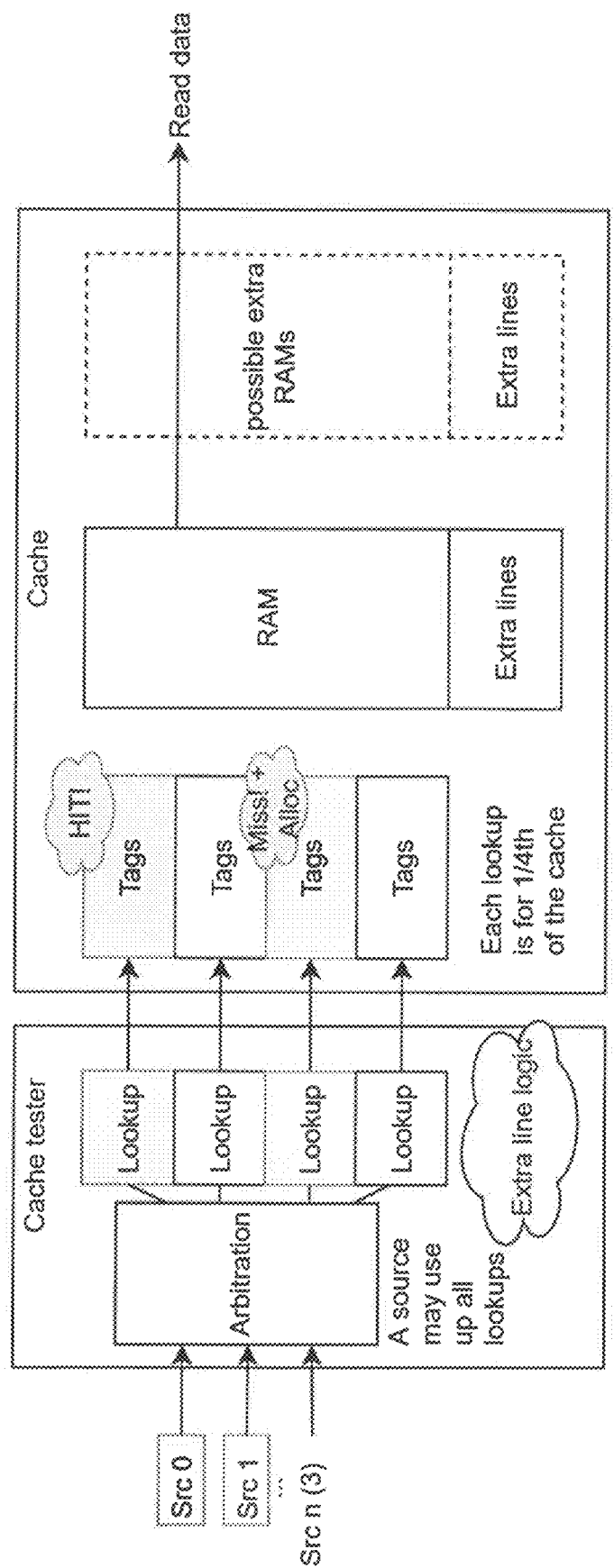
FIG. 7 shows an example of the operation of the cache of FIG. 6 during a normal cache operation using the shared cache portion.

FIG. 7 shows an example of the operation of the cache of FIG. 6 during a normal cache operation. In particular, in FIG. 7, two parallel cache lookups are being performed. In this example, there is a hit on the first lookup (i.e. the data is already present in the shared portion 61 of the cache), and that data can then be transferred to the data processing circuitry 24, and the respective cache line can then be evicted. However, the second lookup misses (i.e. the data is not present in the cache). In this case there is a cache line available in the shared cache portion 61, and that cache line is thus allocated for that data, and the data can be fetched into the shared cache portion 61, and transferred to the data processing circuitry 24 in the usual way.

Once a cache line has been allocated, it is then locked until the data has been used, and while a cache line is locked, it cannot be evicted. Any suitable mechanism may be used for locking the cache lines. For instance, a reference counter can be used to lock a cache line, with the counter being incremented upon cache lookup, and decremented after the data is read out from the cache. If all of the lines of a given sub-cache set within the L1 cache 22 are locked, that set is fully locked.

If a cache set is fully locked, a cache lookup request needs to be successful in order for the data processing operation to progress, since otherwise cache lines in the set cannot be allocated for new data. So, if the data processing operation needs to allocate a cache line for new data, it is necessary to wait for one of the cache lines in the set to become unlocked.

Thus, when all of the cache lines of the shared cache portion 61 are locked, the shared cache portion 61 is fully locked, and is unavailable to process any new transactions. The data processing operation may therefore stall upon this lock. Most of the time, as the data processing operation progresses, there will eventually be one or more cache hit(s), such that data can be read out, and cache lines evicted, and then reallocated for new data, and so on.

However, because of the processing dependencies between the data types in the present example, e.g. as shown in FIG. 4 and FIG. 5, any transactions relating to compressed texture data which cannot go through the L1 cache 22 can block header transactions in the pipeline, preventing them from being read out from the L1 cache 22 (and preventing the cache lines storing the header data from being unlocked). Both compressed texture data and headers might block descriptors in the same way. This means that if all of the cache lines within shared portion 61 of the L1 cache 22 are locked by descriptors, and headers need to allocate data, there is a circular dependency. That is, the descriptors cannot be read out from the L1 cache 22 until the headers have passed through, but the descriptors are currently locking the shared portion 61 of the L1 cache 22 so that the headers are blocked from passing through. Such circular dependency results in the shared portion 61 of the L1 cache 22 becoming deadlocked.

In the present embodiments, the 'extra' dedicated lines provided in the L1 cache 22, as illustrated in FIG. 6, allow such deadlock situations to be overcome.

In particular, when the shared cache portion 61 is unable to allocate a cache line (because it is fully locked), the extra dedicated cache lines can be allocated instead. The extra cache lines then generate memory requests to the memory system 20, and when the extra cache line is filled up, the data can then be read out to the data processing circuitry 24. The extra cache lines thus allow a transaction to effectively bypass the shared cache portion 61.

This mechanism therefore guarantees the absence of deadlocks by eliminating the dependency through the shared cache and breaking the cyclic dependency as a result. Extra lines can thus be thought of as tiny dedicated caches. In that sense, the whole system would be able to work with extra lines alone (albeit at a very slow speed).

Figure 8:
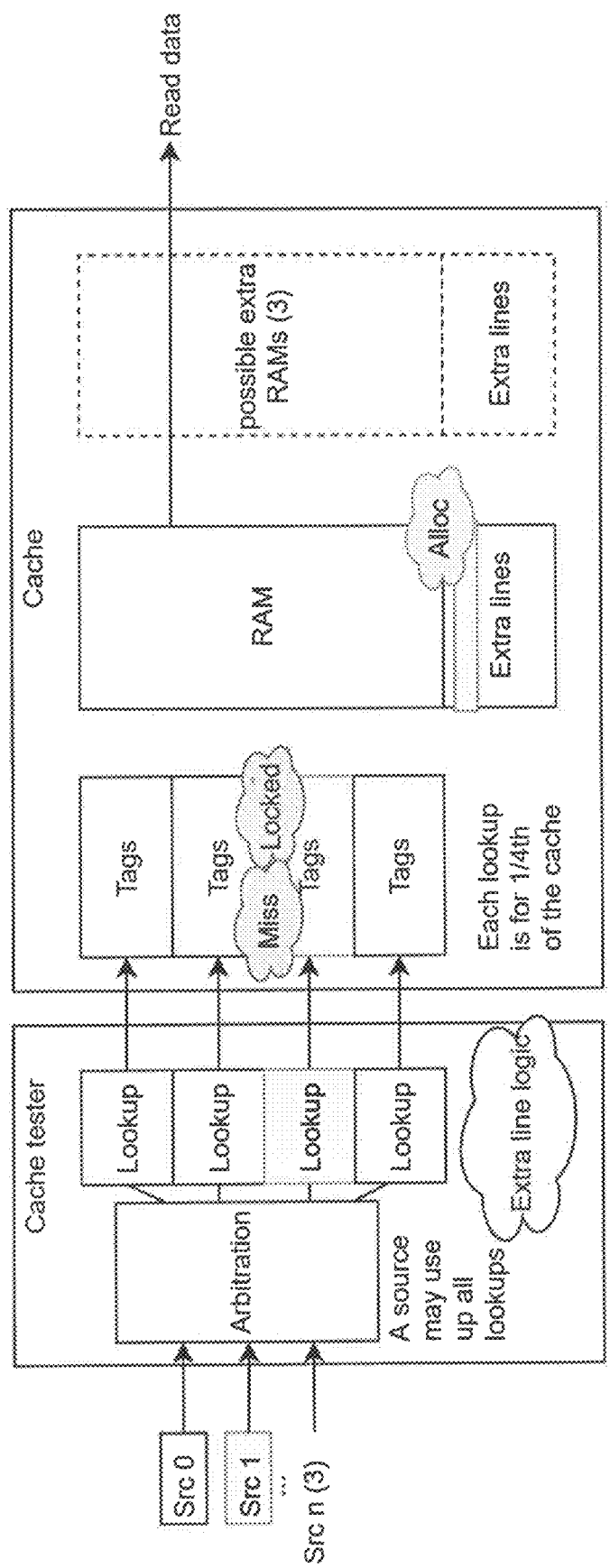
FIG. 8 illustrates an example of the operation of the cache of FIG. 6 when the shared cache portion is fully locked.

FIG. 8 illustrates an example of the operation of the cache of FIG. 6 using the extra cache lines when the shared cache portion is fully locked. Thus, when the shared cache portion 61 is fully locked, such that it is not currently possible to allocate a cache line from the shared cache portion 61 for new data, a transaction may instead use an extra line. So, as shown in FIG. 8, in response to a cache miss for data of a particular data type, when the shared cache portion 61 is fully locked, the extra cache entry dedicated for that data type can instead be allocated (so long as that is not also locked). The transaction can then proceed via the dedicated cache entry, bypassing the shared cache portion 61.

In the present embodiments, when an extra cache entry is filled up, that entry is then fully locked, and is only unlocked once the data has been used. That is, once the extra cache entry is allocated for some data, it is then locked, and remains locked until the data has been fetched from the memory system 20 and subsequently transferred to the data processing circuitry 24. Only once the data has been read out, can the extra line then be freed, and reallocated for use by another transaction.

That is, in the present embodiments, the extra cache entries are "single use", and the use of the extra cache entries is therefore strictly serialised (such that only one transaction of a particular data type can proceed using the respective dedicated cache entry at a time. The dedicated cache entries for different data types can however be used in parallel).

This means that (unlike for the shared cache portion 61) no tags are required in the cache for identifying the data that is using the extra cache entry. This helps to reduce the additional area required for the extra lines, and allows the extra line lookup logic to be kept simple.

A transaction needs to track whether it is using an extra cache entry, and memory request needs to track if it belongs to an extra cache entry. In order to track whether a memory request is using an extra cache entry, a suitable identifier indicating this may then be included into the memory requests. A transaction could use a similar identifier. However, other arrangements would of course be possible. For instance, a transaction could simply include a bit indicating whether (or not) an extra cache entry is used, such that when that bit indicates an extra cache entry is being used, the transaction then knows to look to the extra cache entry.

The data read for the extra line may take place many cycles after the extra line is filled up (for instance, if the transaction is stored in a parking buffer). However, this is generally acceptable since the extra lines are rarely used and it is unlikely that consecutive transactions will use the extra lines.

In practice, extra lines handle the worse-case scenario, in order to overcome deadlocks, whilst for most operations the shared cache will work as normal. The extra lines can thus be provided very cheaply, with little area or processing overhead.

Extra lines never contribute to a deadlock because they are always eventually unlocked. Therefore, any transaction needing the data allocated to the extra lines will be able to use it eventually. In all cases, the transaction that is holding the lock for the extra line will eventually unlock it because:
1) If the transaction is a data transaction, no other type can block it in the processing pipeline, and so it will eventually unlock the extra line;
2) If the transaction is a header transaction it can only be blocked in the pipeline by data transactions; however, data transactions are guaranteed to exit the pipeline, and headers can therefore also exit afterwards; and
3) If the transaction is a descriptor transaction, it could be blocked by both header and data transactions, but these will eventually be able to exit the pipeline allowing the descriptor transaction to enter the pipeline and the extra line to be unlocked.

This reasoning can be extended to any further types of data.

The extra dedicated cache entries can also be used where the cache interface, which is also a shared resource, is currently unavailable, e.g. since it is currently being used by another data transaction. In that case, again, the cache interface can be bypassed using the extra dedicated cache entries.

Figure 9:
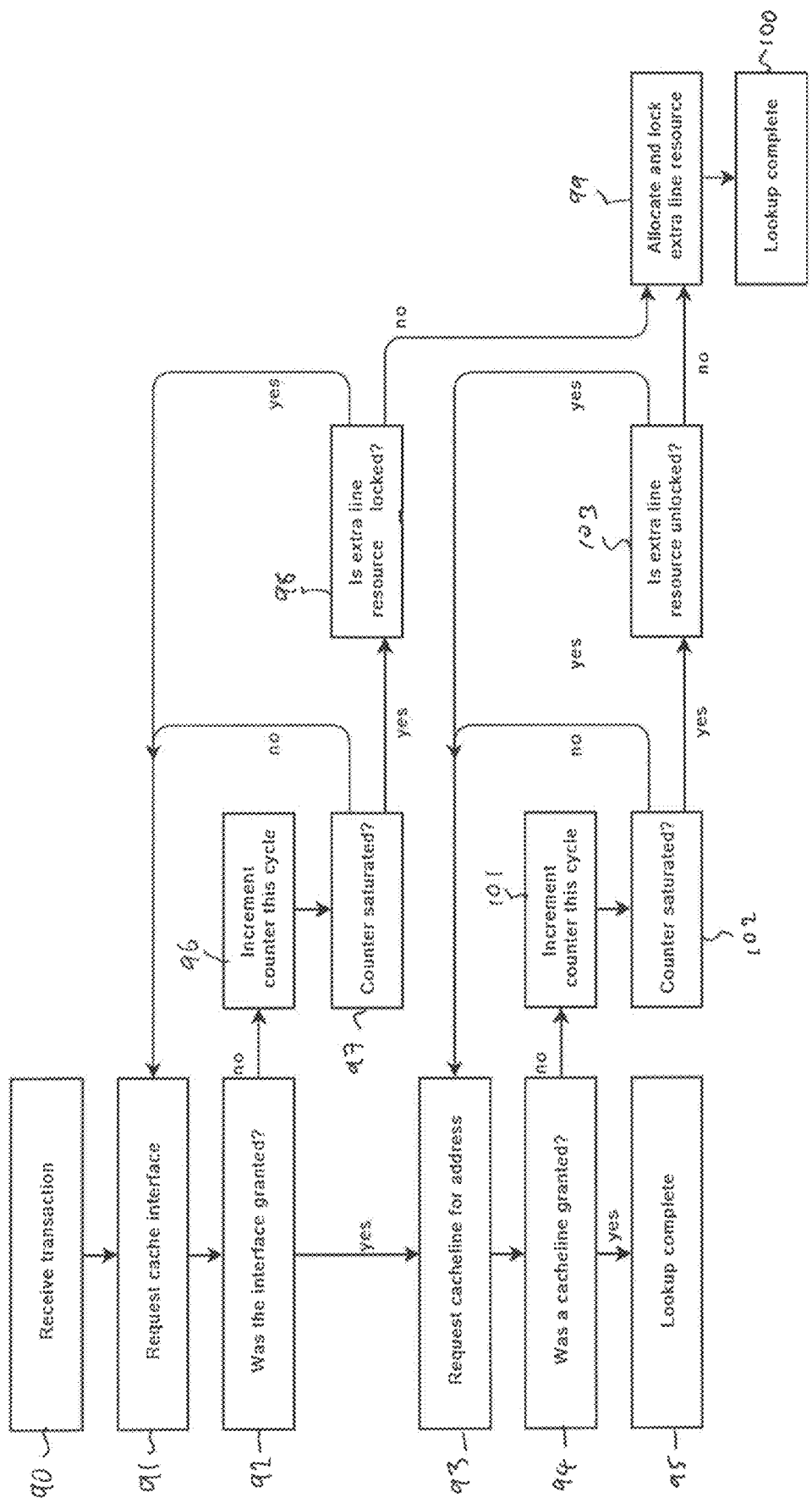
FIG. 9 is a flowchart for a cache lookup for a given data type showing how extra cache lines can be allocated and locked.

FIG. 9 is a flowchart for a cache lookup for a given data type showing how extra cache lines can be allocated for data (all of the types work the same). In particular, FIG. 9 shows how extra lines can be allocated and locked (at least for the case where the data type uses only a single extra line; it will however be appreciated that a data type may use more than one extra line, in a similar fashion). So, in response to receiving a new transaction for a particular data type (step 90), a request is then generated to use the cache interface (step 91). If the cache interface is available (step 92), a request is then issued for a cache line address (step 93). When a cache line is available, that cache line can be allocated (step 94), and the lookup can then be completed (step 95).

On the other hand, if (at step 92) the cache interface is not available, if the dedicated cache entry for the current data type is available (i.e. not locked) (step 98), the dedicated cache entry can then be allocated for the data (and then locked) (step 99). The lookup can then complete using the dedicated cache entry (step 100). In this embodiment, rather than allocating a dedicated cache entry as soon as a request for the interface is not granted, the system waits a predetermined number of cycles before using the dedicated cache entry, as it might be more efficient to wait for the cache interface to become available. In FIG. 9 this is implemented by incrementing a suitable reference counter (step 96) until the counter becomes saturated, after the predetermined wait has completed (step 97), before attempting to allocate the dedicated cache entry.

Similarly, if the interface request is granted (at step 92), but there are no cache lines in the shared cache portion available for allocation (at step 94), the cache line request can instead be processed using the dedicated cache entry. Thus, again, after waiting for a predetermined number of cycles to see if a cache line becomes available (steps 101, 102), it is checked whether the dedicated cache entry is available (step 103), and if so, the dedicated cache entry can be allocated (step 99) and the lookup is completed (step 100).

Figure 10:
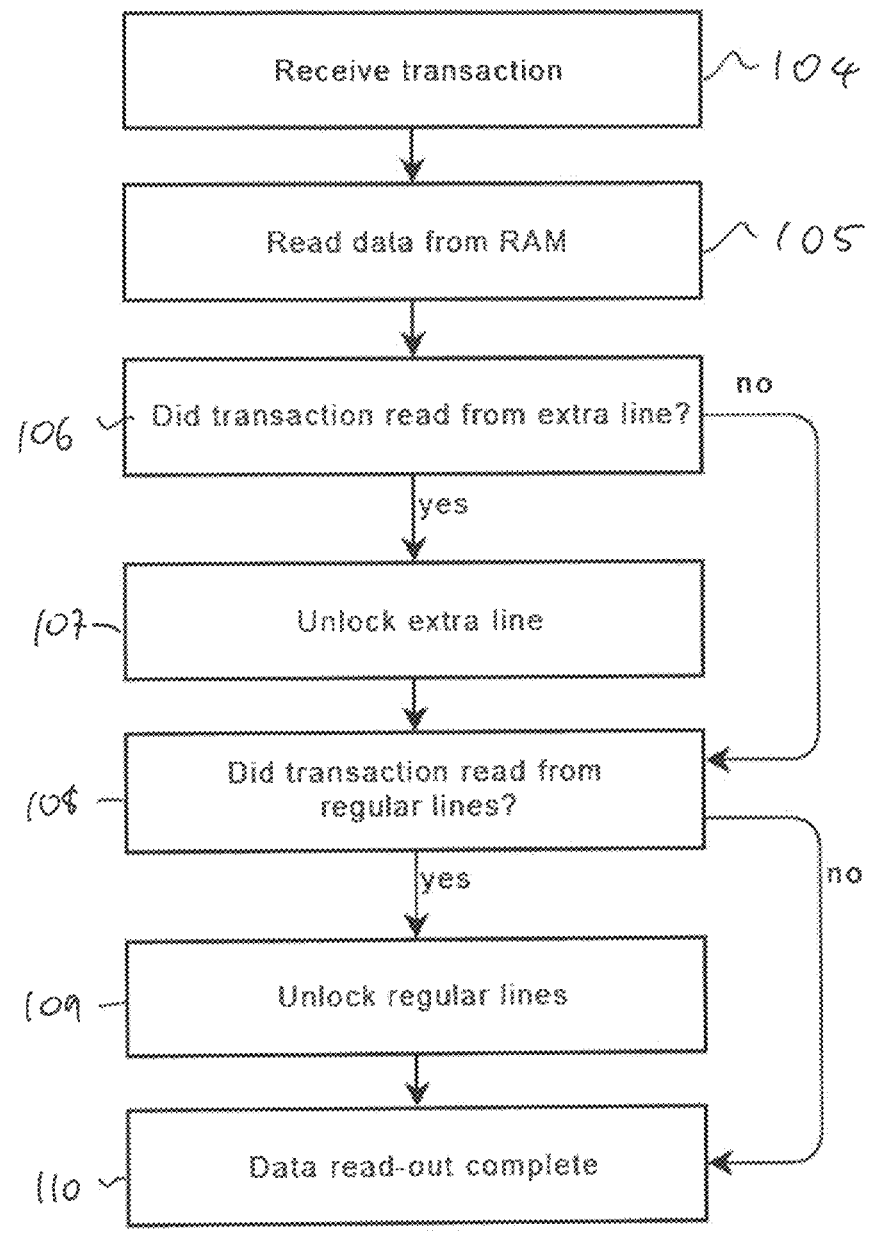
FIG. 10 is flowchart for a cache data read out showing how the extra cache lines (and regular cache lines) can be unlocked.

FIG. 10 is flowchart for a cache data read out showing how the extra line is unlocked. For completeness, FIG. 10 also shows unlocking of regular lines in the shared cache portion. Thus, a transaction is received (step 104), and the data is eventually read from the cache (step 105). If the transaction read from the dedicated cache entry (step 106), the dedicated cache entry is then unlocked (step 107). If the transaction also (or alternatively) used a regular cache line from the shared cache portion (step 108), the regular cache line is also unlocked (step 109), and the data read-out is then complete (step 110).

Figure 11:
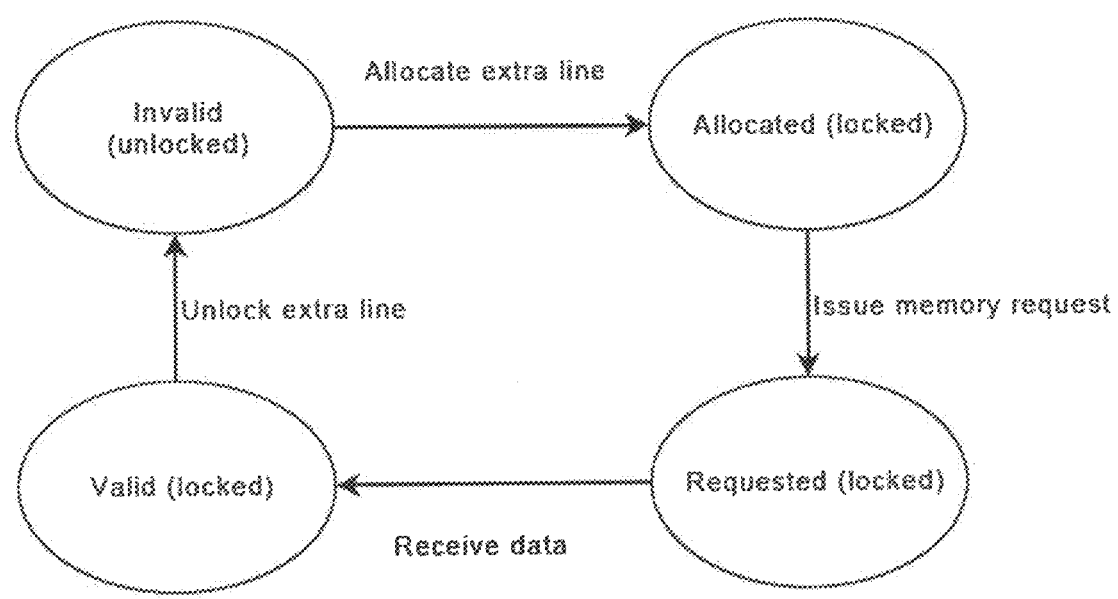
FIG. 11 illustrates an example of a state machine for an extra line.

FIG. 11 illustrates an example of the state machine for an extra line. As shown, once the extra line has been allocated, it is then moved into an allocated state, and 'locked'. A memory request is then issued to the memory system, and the extra line moved into a requested state (where it remains 'locked'). Once the data is received, the extra line becomes valid, and after the data has been read out, the extra line can be unlocked and moved into its invalid state (ready for allocation for new data). FIG. 11 thus shows that the extra line can transition from a locked state directly into an invalid state. This represents the simple instantiation where because the extra line has no tag, it cannot hit for any transaction other than the one that is allocating the extra line.

Although the example described above relates to the processing of texture data it will be appreciated that the technology described herein may in embodiments be used for any suitable data processing system where it is desired to store multiple data types, that may be dependent on one another, within a shared cache.

Thus, although the foregoing detailed description has been presented for the purposes of illustration and description, it is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

The invention claimed is:

1. A data processing system comprising:
a memory system;
one or more data processing unit(s); and
a cache arranged between the memory system and the data processing unit(s) and operable to transfer data stored in the memory system to the data processing unit(s) for use thereby during a data processing operation,
wherein the cache is operable to store data of at least a first data type and a second data type for use by the data processing unit(s), wherein the processing of data of the second data type during a data processing operation is dependent on the processing of data of the first data type;
the cache comprising:
a first, shared cache portion comprising a plurality of cache lines that are available for data of at least the first and second data types, such that so long as there is a cache line in the shared cache portion that is available to be allocated for new data, data of both the first and second data types is written into the shared cache portion; and
a second, dedicated cache portion comprising one or more cache lines that are dedicated for data of the second data type, wherein when the shared cache portion is fully locked such that no new data can be written to the shared cache portion, data of the second data type can instead be written to the dedicated cache portion for transfer to the data processing unit(s).

2. The data processing system of claim 1, wherein when the shared cache portion is fully locked so that no new data can be written to the shared cache portion, the system waits for a predetermined time period, or number of cycles, before using the dedicated cache portion.

3. The data processing system of claim 1, wherein once a cache line of the dedicated cache portion has been allocated for data, the dedicated cache portion is then locked until that data has been transferred to the data processing unit(s).

4. The data processing system of claim 1, wherein the cache line(s) of the dedicated cache portion are not associated with any tags.

5. The data processing system of claim 1, wherein when a cache line of the dedicated cache portion has been allocated for data, a request to the memory system for that data includes an identifier indicating that the dedicated cache portion is being used.

6. The data processing system of claim 1, wherein the shared cache portion is operable to store data of a plurality of different data types, having a hierarchy of processing dependencies, and wherein a respective dedicated cache portion is provided for each dependent data type.

7. The data processing system of claim 1, wherein the dedicated cache portion is defined in the same set of RAM as the shared cache portion, wherein the cache line(s) of the dedicated cache portion are placed at the end of the cache lines of the shared cache portion.

8. The data processing system of claim 1, wherein when a request for data of the second type cannot access a cache-memory interface, because the interface is currently being used by a request for data of another data type, the request is processed using the dedicated cache portion.

9. The data processing system of claim 1, wherein the data processing unit(s) form part of a graphics processor, and wherein the data comprises graphics data.

10. A method of operating a data processing system that comprises a memory system, one or more data processing unit(s), and a cache arranged between the memory system and the data processing unit(s) and operable to transfer data stored in the memory system to the data processing unit(s) for use thereby during a data processing operation, the cache being operable to store data of at least a first data type and a second data type for use by the data processing unit(s),
wherein the processing of data of the second data type by the data processing unit(s) during a data processing operation is dependent on the processing of data of the first data type;
the cache comprising:
a first, shared cache portion comprising a plurality of cache lines that are available for data of at least the first and second data types; and
a second, dedicated cache portion comprising one or more cache lines that are dedicated for data of the second data type;
the method comprising:
when fetching data of either the first or the second data type from the memory system into the cache, so long as there is a cache line in the shared cache portion that is available to be allocated for new data, writing data of both the first and second data types into the shared cache portion; and
when the shared cache portion is fully locked by data of the first data type so that no new data can be written to the shared cache portion, so long as there is a cache line in the dedicated cache portion that is available to be allocated for new data, writing data of the second data type into its dedicated cache portion for transfer to the data processing unit(s).

11. The method of claim 10, wherein when the shared cache portion is fully locked so that no new data can be written to the shared cache portion, the method comprises waiting for a predetermined time period, or number of cycles, before using the dedicated cache portion.

12. The method of claim 10, wherein once a cache line of the dedicated cache portion has been allocated for data, the dedicated cache portion is then locked until that data has been transferred to the data processing unit(s).

13. The method of claim 10, wherein the cache line(s) of the dedicated cache portion are not associated with any tags.

14. The method of claim 10, comprising, when a cache line of the dedicated cache portion has been allocated for data, issuing a request to the memory system for that data including an identifier indicating that the dedicated cache portion is being used.

15. The method of claim 10, wherein the shared cache portion is operable to store data of a plurality of different data types, having a hierarchy of processing dependencies, and wherein a respective dedicated cache portion is provided for each dependent data type.

16. The method of claim 10, wherein the dedicated cache portion is defined in the same set of RAM as the shared cache portion, wherein the cache line(s) of the dedicated cache portion are placed at the end of the cache lines of the shared cache portion.

17. The method of claim 10, comprising issuing a request for data of the second type to a cache-memory interface, and when the request for data of the second type cannot access the cache-memory interface, because the interface is currently being used by a request for data of another data type, processing the request using the dedicated cache portion.

18. The method of claim 10, wherein the data processing unit(s) form part of a graphics processor, and wherein the data comprises graphics data.

19. A non-transitory computer readable storage medium storing software code that when executed on a data processor performs a method of operating a data processing system that comprises a memory system, one or more data processing unit(s), and a cache arranged between the memory system and the data processing unit(s) and operable to transfer data stored in the memory system to the data processing unit(s) for use thereby during a data processing operation, the cache being operable to store data of at least a first data type and a second data type for use by the data processing unit(s), wherein the processing of data of the second data type by the data processing unit(s) during a data processing operation is dependent on the processing of data of the first data type;

the cache comprising:

a first, shared cache portion comprising a plurality of cache lines that are available for data of at least the first and second data types; and a second, dedicated cache portion comprising one or more cache lines that are dedicated for data of the second data type;

the method comprising:

when fetching data of either the first or the second data type from the memory system into the cache, so long as there is a cache line in the shared cache portion that is available to be allocated for new data, writing data of both the first and second data types into the shared cache portion; and when the shared cache portion is fully locked by data of the first data type so that no new data can be written to the shared cache portion, so long as there is a cache line in the dedicated cache portion that is available to be allocated for new data, writing data of the second data type into its dedicated cache portion for transfer to the data processing unit(s).

20. The data processing system of claim 1, wherein when the shared cache portion is fully locked by data of the first data type, the cache is configured to write data of the second data type to the second, dedicated cache portion.

* * * * *